(12) United States Patent
Aramaki et al.

(10) Patent No.: US 9,876,256 B2
(45) Date of Patent: Jan. 23, 2018

(54) ELECTRODE STACKING DEVICE AND ELECTRODE STACKING METHOD

(75) Inventors: Isao Aramaki, Machida (JP); Keisuke Noda, Hirakata (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 916 days.

(21) Appl. No.: 14/009,484

(22) PCT Filed: Apr. 6, 2012

(86) PCT No.: PCT/JP2012/059534
§ 371 (c)(1),
(2), (4) Date: Oct. 2, 2013

(87) PCT Pub. No.: WO2012/137926
PCT Pub. Date: Oct. 11, 2012

(65) Prior Publication Data
US 2014/0020235 A1    Jan. 23, 2014

(30) Foreign Application Priority Data

Apr. 7, 2011    (JP) ................................. 2011-085758
Apr. 7, 2011    (JP) ................................. 2011-085766
Mar. 23, 2012   (JP) ................................. 2012-067842

(51) Int. Cl.
*H01M 10/0585*    (2010.01)
*H01M 2/16*       (2006.01)
(Continued)

(52) U.S. Cl.
CPC ..... *H01M 10/0585* (2013.01); *H01M 2/1673* (2013.01); *H01M 2/18* (2013.01);
(Continued)

(58) Field of Classification Search
CPC .. Y10T 29/53135; Y10T 29/49108–29/49115; H01M 10/0585;
(Continued)

(56) References Cited

U.S. PATENT DOCUMENTS 3,658,518 A * 4/1972 Baltazzi ................ G03G 5/073
                                                 428/337
4,806,432 A * 2/1989 Eguchi .................. H05K 3/381
                                                 428/457
(Continued)

FOREIGN PATENT DOCUMENTS

EP    2 458 669 A2    5/2012
JP    4-101366 A      4/1992
(Continued)

OTHER PUBLICATIONS

European Extended Search Report, dated Nov. 20, 2014, 8 pages.
Taiwanese Office Action, dated Mar. 17, 2014, 6 pages.

*Primary Examiner* — A. Dexter Tugbang
*Assistant Examiner* — Kaying Kue
(74) *Attorney, Agent, or Firm* — Foley & Lardner LLP

(57) ABSTRACT

A device including a detector 200 for detecting position of a positive electrode 24 as a first electrode in terms of a packaged electrode having a bag-shaped separator 40 in which the positive electrode is provided, and stacking unit 112 and 122 for stacking the positive electrode 24 as the first electrode on a negative electrode 30 as a second electrode having a different polar characteristics from that of the positive electrode 24 as the first electrode on the basis of the position of the positive electrode 24 as the first electrode thus detected.

17 Claims, 19 Drawing Sheets

(51) Int. Cl.
*H01M 2/18* (2006.01)
*H01M 4/13* (2010.01)
*H01M 4/139* (2010.01)
*H01M 10/04* (2006.01)
*H01M 10/0525* (2010.01)

(52) U.S. Cl.
CPC ............. *H01M 4/13* (2013.01); *H01M 4/139* (2013.01); *H01M 10/0404* (2013.01); *H01M 10/0413* (2013.01); *H01M 10/0436* (2013.01); *H01M 10/0525* (2013.01); *Y10T 29/49004* (2015.01); *Y10T 29/53135* (2015.01)

(58) Field of Classification Search
CPC ........ H01M 2/18; H01M 2/1673; H01M 4/04; H01M 4/39; H01M 4/13; H01M 4/139; H01M 10/04; H01M 2/16; H01M 10/0436; H01M 10/0525; H01M 10/0404; H01M 10/0413; G01B 11/00
USPC .............................. 29/623.1–623.5, 730–731
See application file for complete search history.

(56) References Cited

U.S. PATENT DOCUMENTS

| | | | | |
|---|---|---|---|---|
| 5,278,012 A * | 1/1994 | Yamanaka | ....... | G01N 21/95684 250/559.44 |
| 5,293,984 A | 3/1994 | Lucas | | |
| 5,443,602 A * | 8/1995 | Kejha | ................... | H01M 4/381 29/623.1 |
| 5,608,847 A * | 3/1997 | Pryor | ................... | A01B 69/008 700/248 |
| 6,014,209 A * | 1/2000 | Bishop | ............... | G01N 21/9501 356/237.5 |
| 6,084,664 A * | 7/2000 | Matsumoto | ............ | G01N 21/94 250/559.41 |
| 6,709,785 B2 | 3/2004 | Lee et al. | | |
| 7,014,948 B2 * | 3/2006 | Lee | ................... | B01D 67/0013 429/144 |
| 7,142,405 B2 * | 11/2006 | Miyaji | ................... | B23Q 3/154 361/234 |
| 7,220,516 B2 * | 5/2007 | Oosawa | ................... | B60L 11/18 180/65.1 |
| 7,561,434 B2 * | 7/2009 | Nakamura | .......... | H01L 21/4846 257/784 |
| 8,397,372 B2 | 3/2013 | Hori et al. | | |
| 9,046,352 B2 * | 6/2015 | Aramaki | ............ | G01B 11/002 |
| 9,246,186 B2 * | 1/2016 | Ku | ................... | H01M 10/0585 |
| 9,252,452 B2 * | 2/2016 | Kwon | ................... | H01M 2/266 |
| 9,300,003 B2 * | 3/2016 | Park | ................... | H01M 10/0404 |
| 2002/0160257 A1 | 10/2002 | Lee et al. | | |
| 2003/0037431 A1 * | 2/2003 | Benson | ................... | H01M 2/266 29/623.1 |
| 2004/0237295 A1 * | 12/2004 | Wakizaka | .............. | H05K 3/389 29/830 |
| 2005/0005437 A1 * | 1/2005 | Nakamura | ................ | B32B 7/12 29/846 |
| 2006/0088761 A1 * | 4/2006 | Ota | ........................ | H01M 2/18 429/130 |
| 2006/0127732 A1 * | 6/2006 | Yoshida | ................... | H01M 8/00 29/623.1 |
| 2007/0207367 A1 * | 9/2007 | Fellows | .............. | H01M 8/0662 429/415 |
| 2008/0187788 A1 * | 8/2008 | Fellows | ............ | H01M 8/04097 429/415 |
| 2009/0113704 A1 * | 5/2009 | Toyoda | ................ | G01N 21/956 29/850 |
| 2009/0114426 A1 * | 5/2009 | Tsunekawa | ....... | G01N 21/95684 174/250 |
| 2010/0109688 A1 * | 5/2010 | Eldridge | .................. | G01R 3/00 324/755.01 |
| 2010/0208250 A1 * | 8/2010 | Ihara | ...................... | G01N 21/94 356/237.4 |
| 2010/0221595 A1 * | 9/2010 | Murata | ................... | H01G 9/016 429/128 |
| 2010/0281685 A1 * | 11/2010 | Hori | ................... | H01M 10/0409 29/761 |
| 2012/0305049 A1 * | 12/2012 | Yuya | ................ | H01L 31/02242 136/244 |

FOREIGN PATENT DOCUMENTS

| | | |
|---|---|---|
| JP | 6-6652 A | 1/1994 |
| JP | 6-121325 A | 4/1994 |
| JP | 6-253190 A | 9/1994 |
| JP | 7-302616 A | 11/1995 |
| JP | 9-123435 A | 5/1997 |
| JP | 2000-182610 A | 6/2000 |
| JP | 2000-182658 A | 6/2000 |
| JP | 3380935 B2 | 2/2003 |
| JP | 2003-272595 A | 9/2003 |
| JP | 2003-344020 A | 12/2003 |
| JP | 2004-235089 A | 8/2004 |
| JP | 2005-235583 A | 10/2005 |
| JP | 2009-170136 A | 7/2009 |
| JP | 2010-232145 A | 10/2010 |
| JP | 2010-257861 A | 11/2010 |
| KR | 10-2011-0014947 A | 2/2011 |
| TW | 490875 | 6/2002 |
| WO | WO 2006/095579 A1 | 9/2006 |

* cited by examiner

FIG. 3
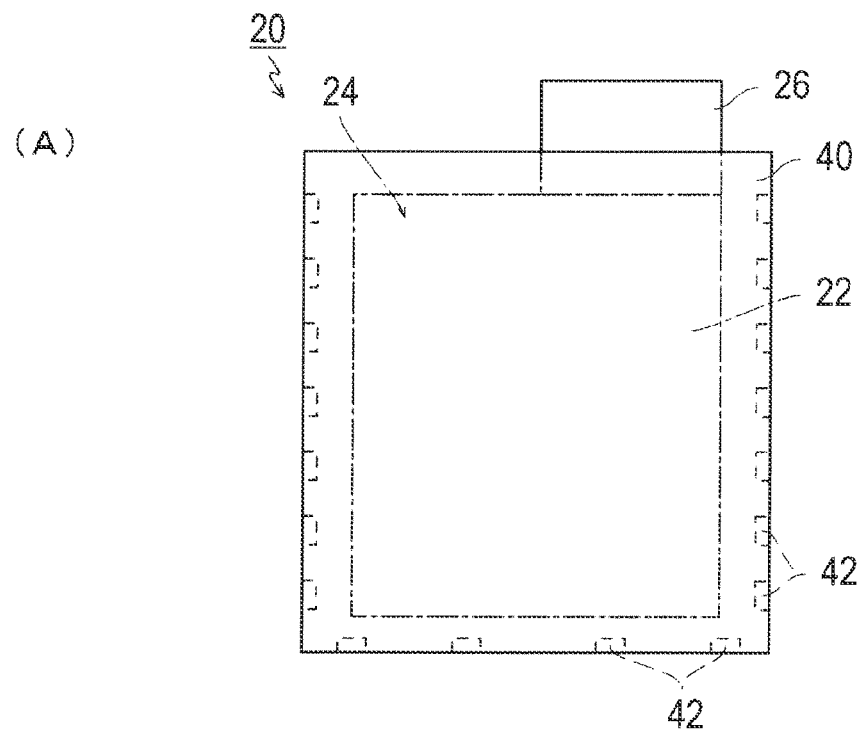
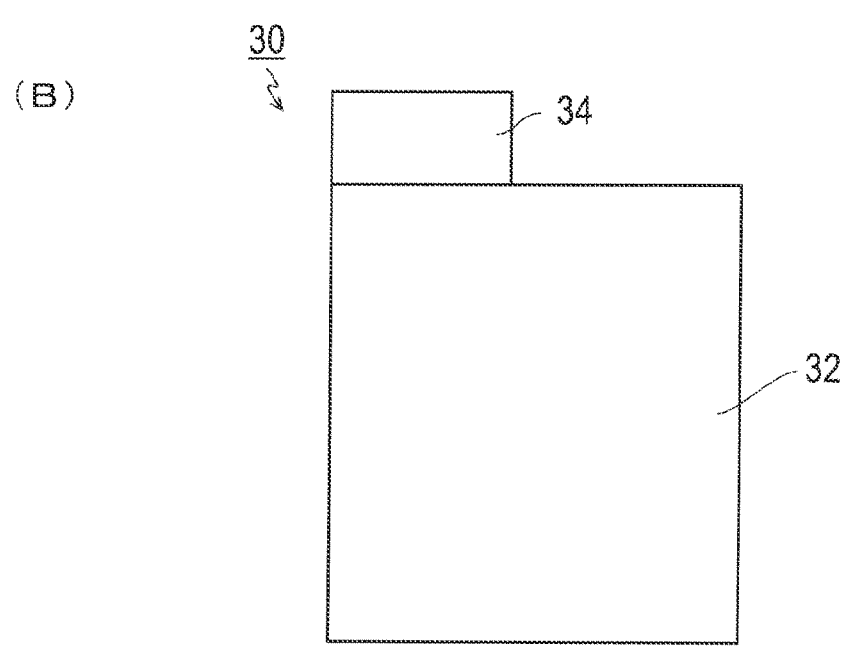

FIG. 9
(A)
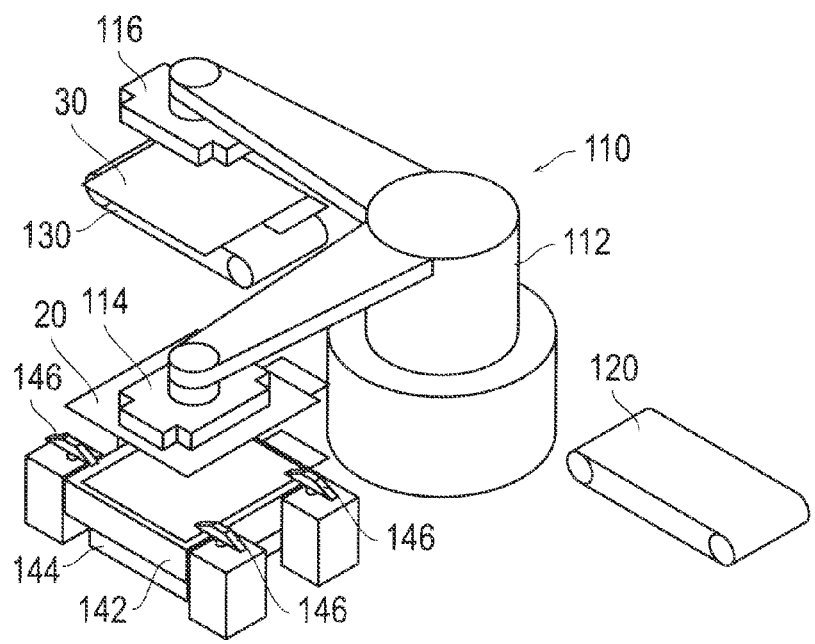
(B)
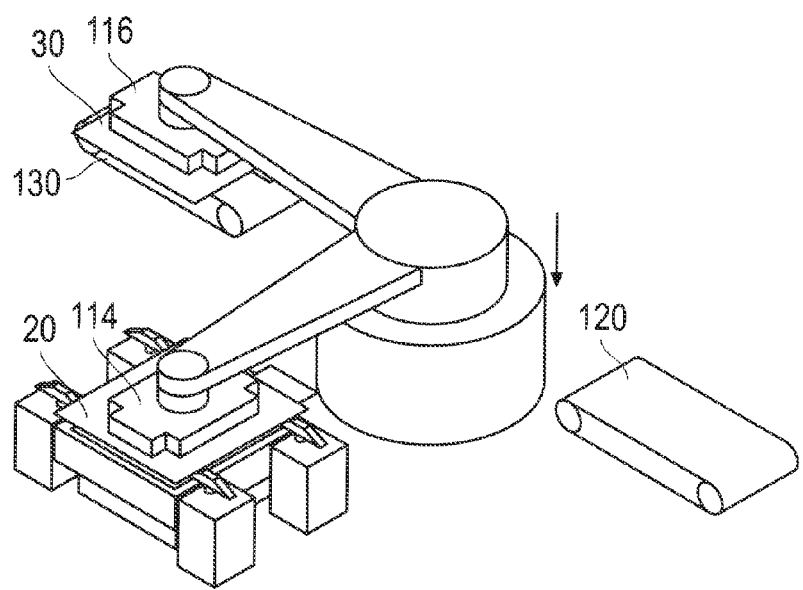

FIG. 10
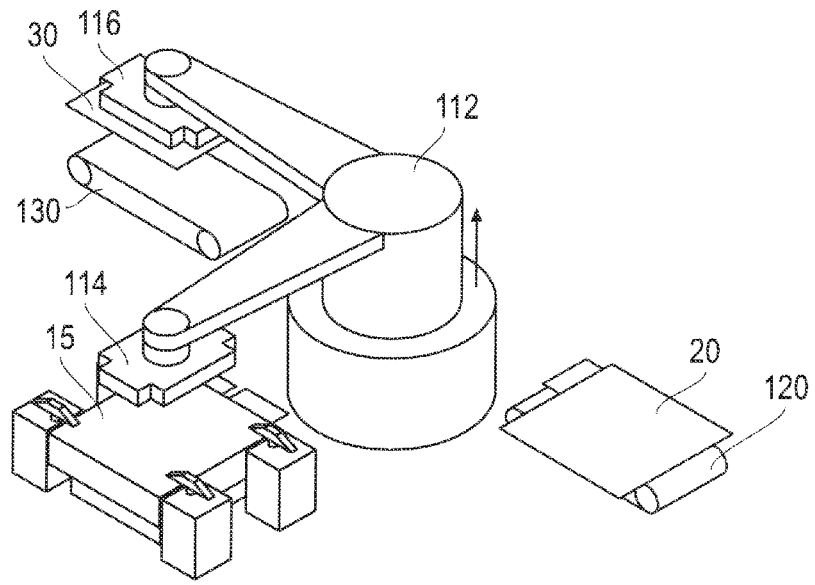
(C)
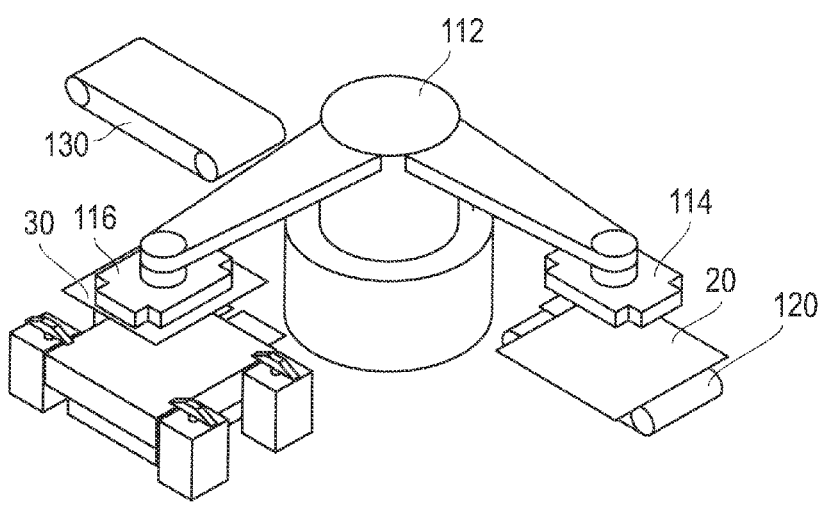
(D)

FIG. 11
(E)
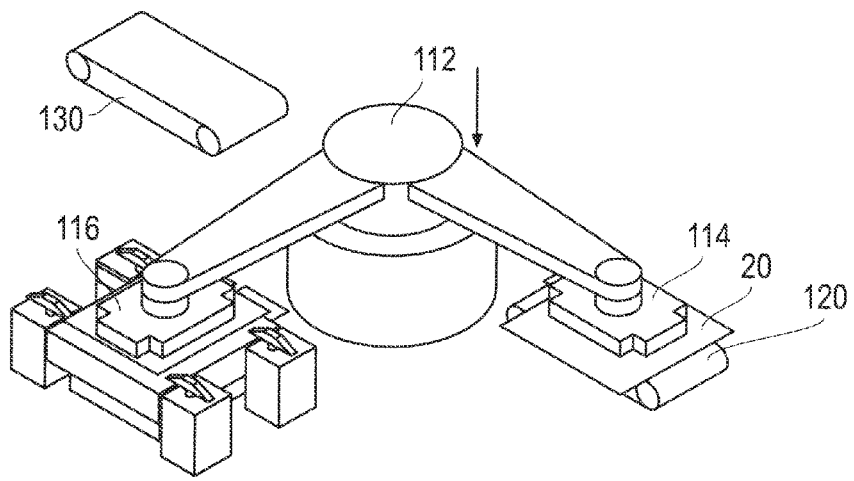
(F)
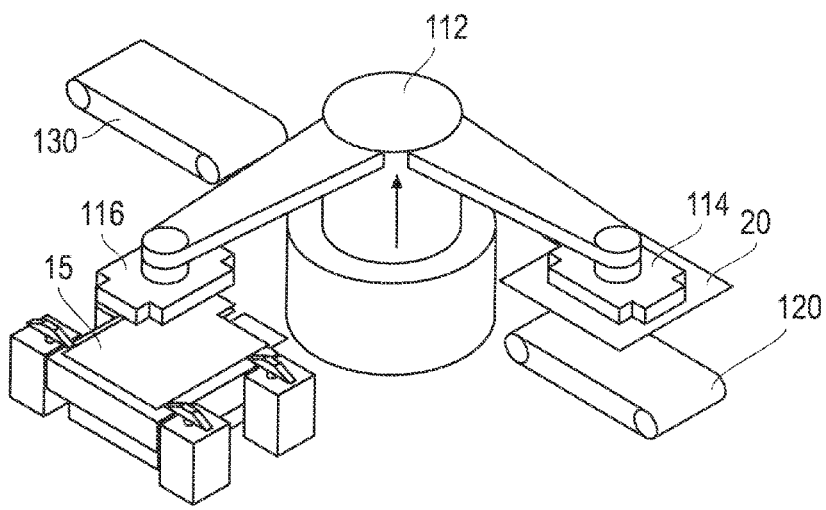

FIG. 14
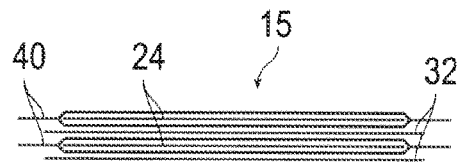
(A)
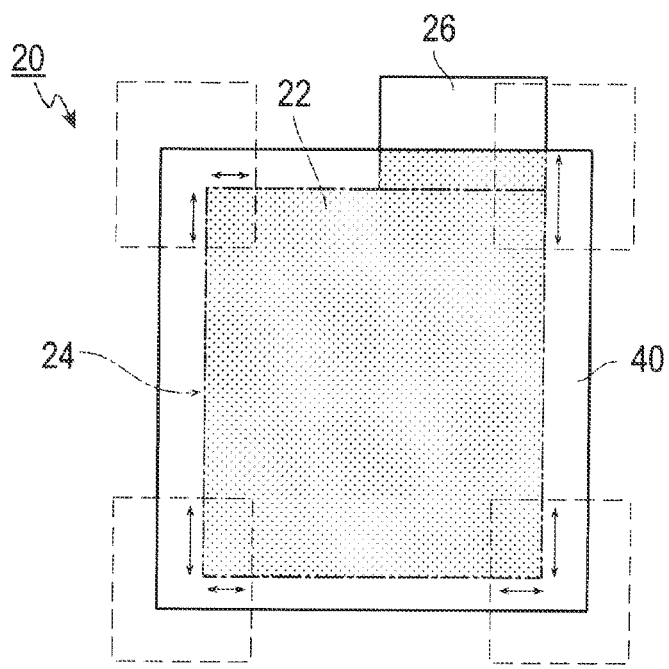
(B)
FIG. 15
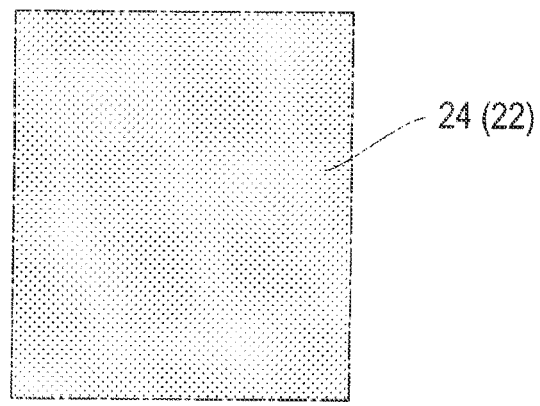

FIG. 16
(A) 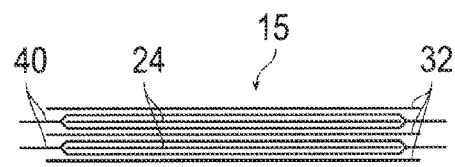
(B) 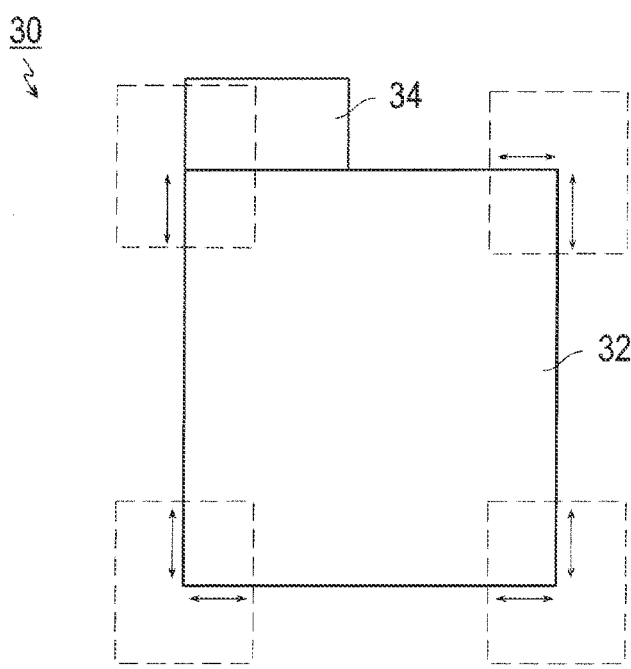
FIG. 17
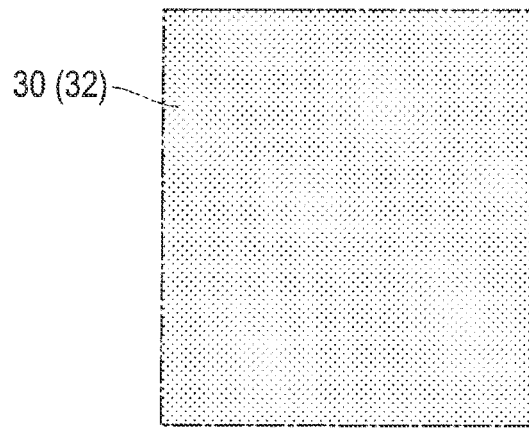

FIG. 23
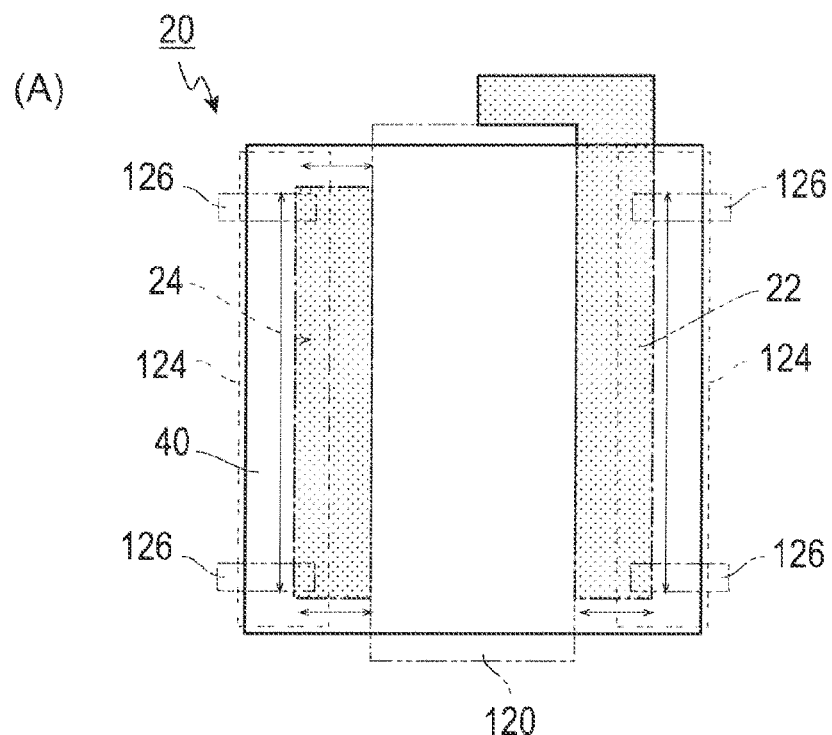
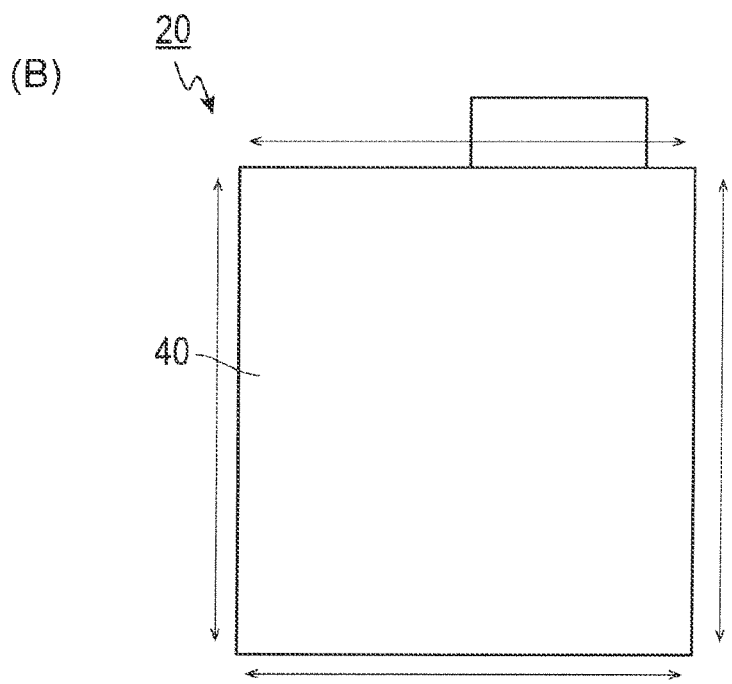

ELECTRODE STACKING DEVICE AND ELECTRODE STACKING METHOD

TECHNICAL FIELD

The present invention relates to an electrode stacking device and an electrode stacking method.

BACKGROUND ART

In recent years, a secondary battery has been used for various products. A secondary battery includes a battery element in which a positive electrode, a separator, and a negative electrode are stacked. It is important for the battery element that the positive electrode and the negative electrode are stacked without positional deviation via the separator. This is because such positional deviation could deteriorate the performance of the battery or shorten the life of the battery.

Therefore, in order to prevent positional deviation between the positive electrode and the negative electrode, a technique to stack the positive electrode and the negative electrode rapidly and accurately by providing the positive electrode in a separator formed in a bag shape and the stacking a bag-shaped separator and the negative electrode has been suggested (refer to Patent Literature 1). According to this technique, the separator and the negative electrode are formed to have approximately same size and stacking the separator and the negative electrode by aligning the external sides enables accurate positioning of the negative electrode and the positive electrode inside the separator.

CITATION LIST

Patent Literature

Patent Literature 1: Japanese Patent No. 3380935

SUMMARY OF INVENTION

However, according to the invention described in the Patent Literature 1, while aligning the external sides of the separator and the negative electrode is described, specific method for aligning them is not described. It is difficult to align the external shape in the first place and there is no guarantee that the positive electrode and the negative electrode are accurately aligned and stacked in case the external shape is not aligned well. Moreover, to align the external shape accurately, number of processes is increased and therefore the electrodes cannot be stacked rapidly and yield cycle time is worsened.

Moreover, according to the invention described in the Patent Literature 1, in a case where the size of the bag-shaped separator and the negative electrode differs from each other, positioning of the positive electrode and the negative electrode cannot be guaranteed.

The present invention has been made in consideration of the above problems and aims at providing an electrode stacking device and an electrode stacking method which can appropriately stack an electrode bag-shaped in a separator on another electrode.

The electrode stacking device of the present invention includes a detector and a stacking unit. The detector detects position of a first electrode in terms of a packaged electrode including the bag-shaped separator in which the first electrode has been provided. The stacking unit stacks the first electrode on a second electrode having a different polar character from that of the first electrode based on the detected position of the first electrode.

The electrode stacking method of the present invention includes a detection step and a stacking step. The detection step detects position of a first electrode in terms of a packaged electrode including the bag-shaped separator in which the first electrode has been provided. The stacking step stacks the first electrode on a second electrode having a different polar character from that of the first electrode based on the detected position of the first electrode.

According to the electrode stacking device and the electrode stacking method of the present invention, position of the first electrode hidden in the separator is detected and based on the position of the first electrode thus detected, the packaged electrode is stacked on the second electrode. Therefore, because it becomes to stack the packaged electrode on the second electrode taking the position of the first electrode into consideration, the first electrode and the second electrode can be accurately positioned and stacked.

BRIEF DESCRIPTION OF DRAWINGS

FIG. 3(A) is a plan view of a packaged positive electrode and FIG. 3(B) is a plan view of a negative electrode.

FIG. 9 (A) is a perspective view showing that a suction hand is positioned above a stacking stage and a negative electrode supply table in a stacking operation of the negative electrode and the packaged positive electrode by a stacking robot, and FIG. 9(B) is a perspective view showing that a suction hand is moved down in a stacking operation of the negative electrode and the packaged positive electrode by the stacking robot.

FIG. 10(C) is a perspective view showing that an L-shaped arm is moved up for a predetermined degree in a stacking operation of the negative electrode and the packaged positive electrode by the stacking robot. FIG. 10(D) is a perspective view showing that the L-shaped arm is rotated for a predetermined degree.

FIG. 11 (E) is a perspective view showing that the L-shaped arm is moved down for a predetermined degree in a stacking operation of the negative electrode and the packaged positive electrode by the stacking robot. FIG. 11(F) is a perspective view showing that the L-shaped arm is moved up for a predetermined degree in a stacking operation of the negative electrode and the packaged positive electrode by the stacking robot.

FIG. 14 includes conceptual diagrams showing how position of the positive electrode inside the packaged positive electrode is confirmed. FIG. 14(A) is a conceptual diagram of a stacked body seen from front side when the position of the positive electrode inside the packaged positive electrode is confirmed, and FIG. 14(B) is a conceptual diagram of the stacked body seen from plain surface.

FIG. 15 is a conceptual diagram showing the positive electrode whose sides are specified.

FIG. 16 includes concept showing how the position of the negative electrode is confirmed. FIG. 16(A) is a conceptual diagram seen from front side of the stacked body when the position of the negative electrode is confirmed and FIG. 16(B) is a conceptual diagram seen from plain surface of the stacked body.

FIG. 17 is a conceptual diagram showing the negative electrode whose sides are specified.

FIG. 23(A) is a conceptual diagram showing how the position of the positive electrode inside the packaged positive electrode is confirmed, and FIG. 23(B) is a conceptual diagram showing how the position of the separator is confirmed.

DESCRIPTION OF EMBODIMENTS

Hereinafter, embodiments of the present invention will be explained with reference to attached figures. Here, proportion of size in the figures may be exaggerated for the sake of explanation and may differ from actual proportion.

The present invention relates to an electrode position detection device used in the part of production process of a secondary battery. Before explaining the electrode position detection device which is one embodiment of the present invention, explanation will be given of the configuration of a battery and a sheet stacking device which assembles a power generation element of the battery.

(Battery)

Figure 1:
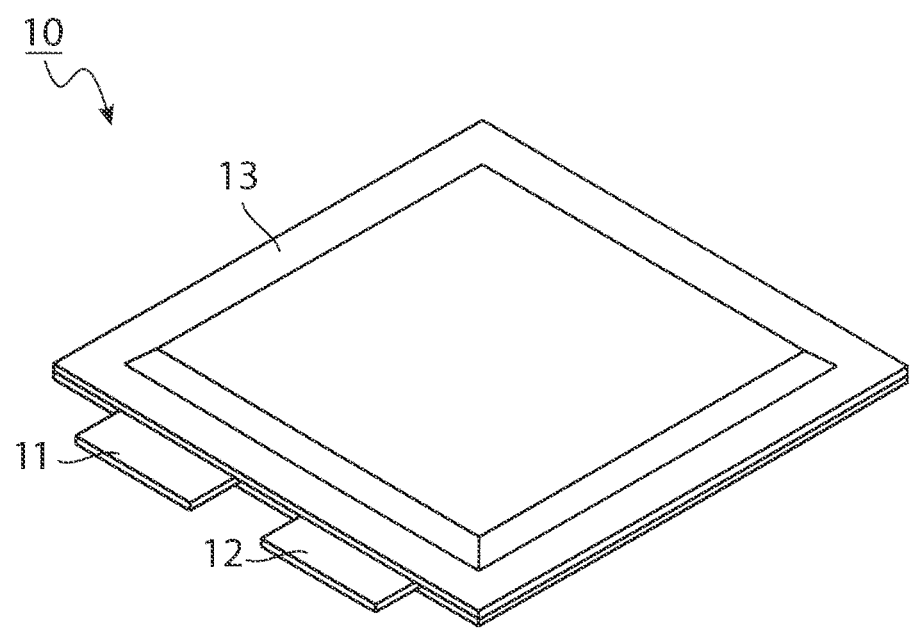
FIG. 1 is a perspective view showing an external view of a lithium-ion secondary battery.
Figure 2:
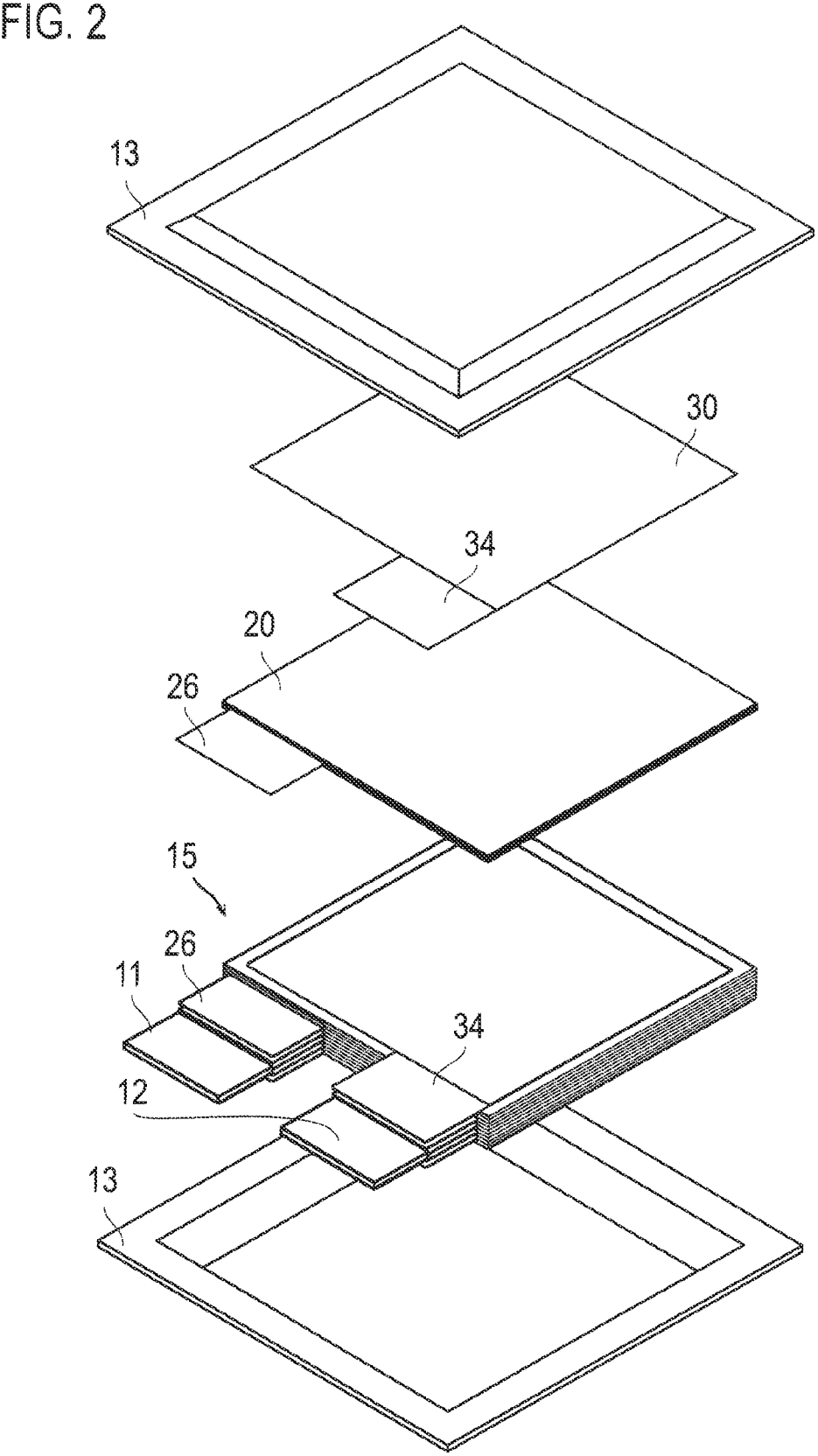
FIG. 2 is an exploded perspective view of the lithium-ion secondary battery.
Figure 4:
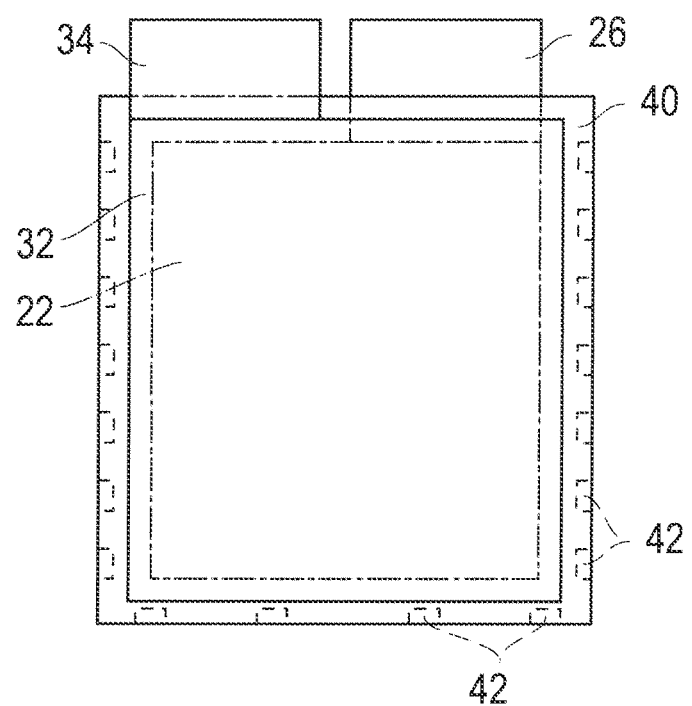
FIG. 4 is a plan view showing a packaged positive electrode on which the negative electrode is stacked.

First, with reference to FIG. 1, a lithium-ion secondary battery (stacked type battery) formed by the sheet stacking device will be explained. FIG. 1 is a perspective view showing an external view of the lithium-ion secondary battery, FIG. 2 is an exploded perspective view of the lithium-ion secondary battery, FIG. 3 is a plan view of a negative electrode and a packaged positive electrode, and FIG. 4 is a plan view showing a packaged positive electrode on which the negative electrode is stacked.

As shown in FIG. 1, a lithium-ion secondary battery 10 has a flat rectangular shape and a positive electrode lead 11 and a negative electrode lead 12 are derived from one same edge portion of an exterior material 13. Inside the external material, a power generation element (battery element) 15 by which discharge and charge reactions are carried out is stored. As shown in FIG. 2, the power generation element 15 is formed by alternately stacking a packaged positive electrode 20 and a negative electrode 30.

The packaged positive electrode 20 includes a positive electrode 24, which has positive-electrode active material layer 22 on both surfaces of a sheet-shaped positive electrode power collecting body, being sandwiched by separators 40. The two separators 40 are joined with each other by joining portion 42 at edges to form a bag-shape. A tab portion 26 of the positive electrode 24 is pulled out from the bag of the separator 40. The positive electrode 24 has a positive electrode active material layer 22 in a portion other than the tab portion 26.

As shown in FIG. 3(B), the negative electrode 30 includes negative-electrode active material layers 32 on both surfaces of a very thin sheet-shaped negative electrode power collecting body. The negative electrode 30 has the negative electrode active material layer 32 in a portion other than a tab portion 34.

FIG. 4 shows a case where the packaged positive electrode 20 is overlapped by the negative electrode 30. As shown in FIG. 4, the negative electrode active material layer 32 is formed to be slightly larger than the positive electrode active material layer 22 of the positive electrode 24 when viewed planarly.

Note that the method for producing a lithium-ion secondary battery by alternately stacking the packaged positive electrode 20 and the negative electrode 30 is a common production method of a lithium-ion secondary battery and therefore detailed explanation thereof is omitted here.

(Sheet Stacking Device)

Next, a sheet stacking device (electrode stacking device) for assembling the power generation element 15 will be explained.

Figure 5:
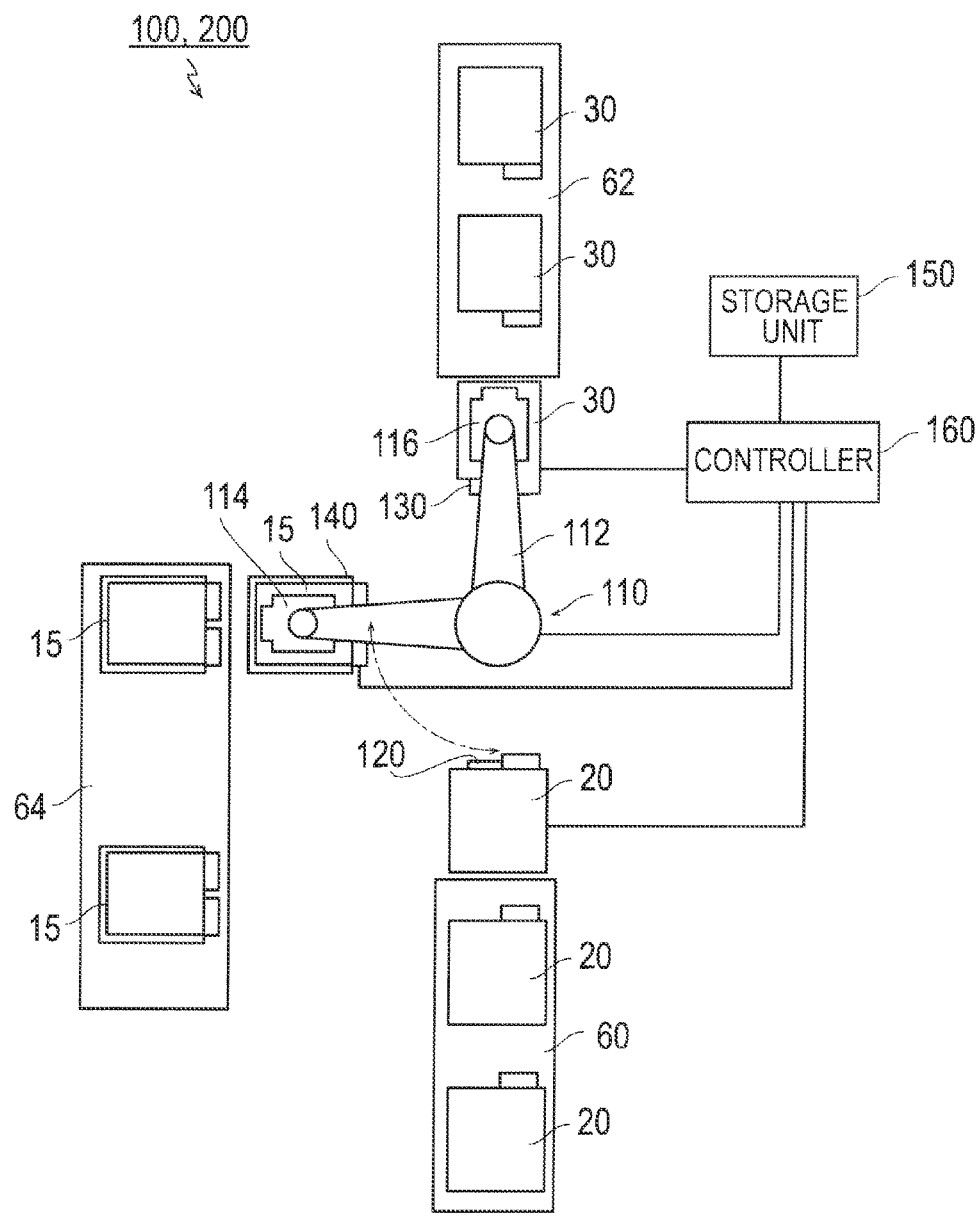
FIG. 5 is a schematic plan view showing a sheet stacking device.
Figure 6:
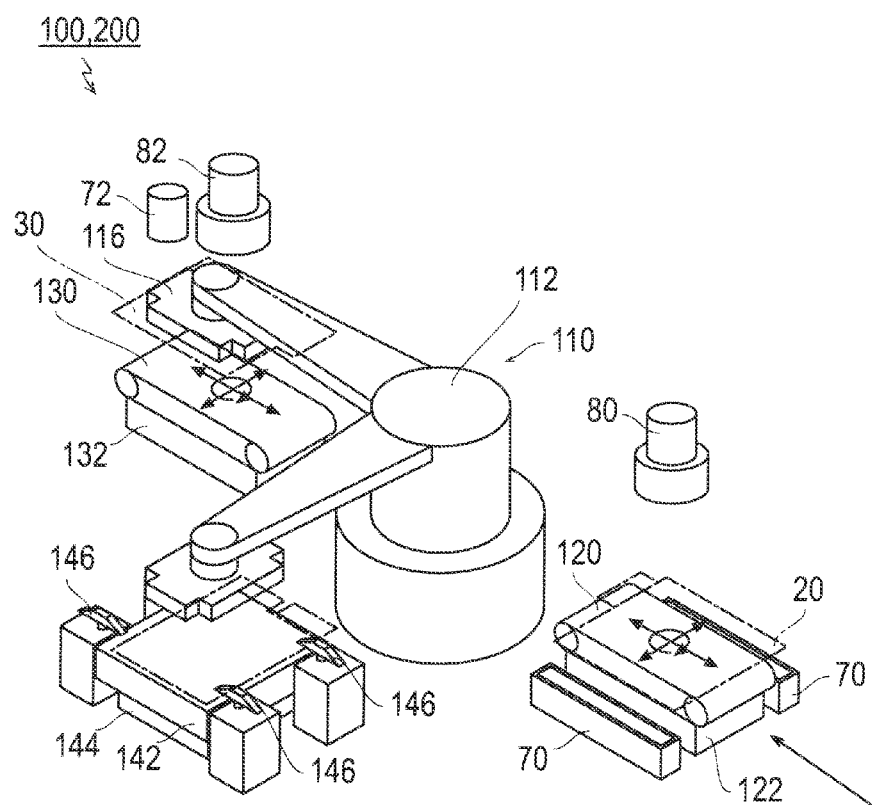
FIG. 6 is a perspective view showing the sheet stacking device.
Figure 7:
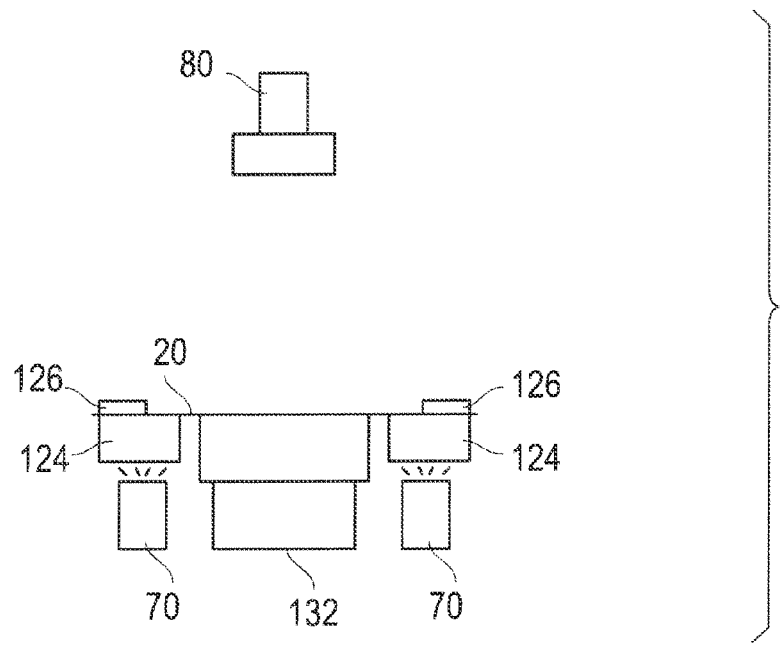
FIG. 7 is a front elevational view of a positive electrode supply table seen in the direction of an arrow in FIG. 6.
Figure 8:
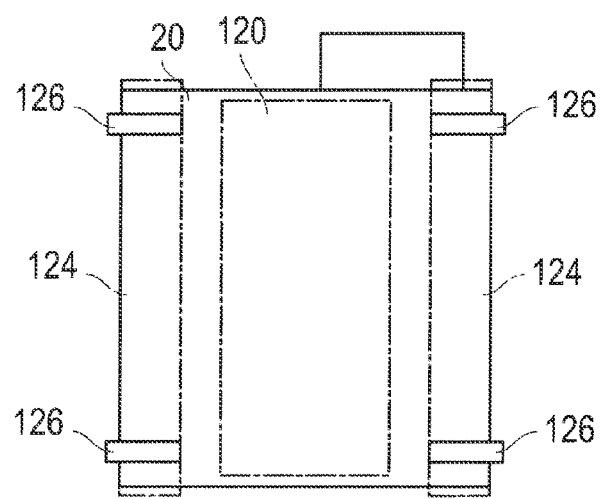
FIG. 8 is a plan view of the positive electrode supply table.

FIG. 5 is a schematic plan view showing a sheet stacking device, FIG. 6 is a perspective view showing the sheet stacking device, FIG. 7 is a front elevational view of a positive electrode supply table seen in the direction of an arrow in FIG. 6, and FIG. 8 is a plan view of the positive electrode supply table.

As shown in FIG. 5 and FIG. 6, a sheet stacking device 100 includes a stacking robot 110, a positive electrode supply table 120, a negative electrode supply table 130, a stacking stage 140, a storage unit 150, and a controller 160. The stacking robot 110, the positive electrode supply table 120, the negative electrode supply table 130, and the stacking stage 140 are controlled by the controller 160. Moreover, a control program and various data of the controller 160 are stored in the storage unit 150.

The stacking robot 110 alternately stacks the packaged positive electrode 20 and the negative electrode 30 to form the power generation element (stacked body) 15. The stacking robot 110 has an L-shaped arm 112 and first and second suction hands 114 and 116 provided at the ends of the L-shaped arm 112. The L-shaped arm 112 rotates by a predetermined degree, for example, 90 degrees in this embodiment, in horizontal direction. Moreover, the L-shaped arm 112 can move in vertical direction by a predetermined amount. The first suction hand 114 is provided at one end of the L-shaped arm 112 and sucks and retains or releases the packaged positive electrode 20. The second suction hand 116 is provided at another end of the L-shaped arm 112 and sucks and retains or releases the negative electrode 30.

The positive electrode supply table 120 is a table for supplying the packaged positive electrode 20 to the L-shaped arm 112. The positive electrode supply table 120 receives the packaged positive electrode 20 produced in the previous process and carried by a suction conveyer 60 one by one and mounts it on the table. The positive electrode supply table 120 is also a suction conveyer and sucks the packaged positive electrode 20 which is released from negative pressure from the suction conveyer 60, carries the packaged positive electrode 20 to the approximate center of the table and sets the packaged positive electrode 20 by negative pressure. Moreover, the positive electrode supply table 120 can move and rotate in planar direction in order to adjust plan position of the packaged positive electrode 20. The positive electrode supply table 120 is provided on, for example, an XY stage 122 and the XY stage 122 moves in X and Y directions or rotates in planar direction to adjust plan position. The XY stage 122 is enabled to move and rotate in planar direction by three motors.

The positive electrode supply table 120 is designed to have a smaller width than the suction conveyer 60 so that lateral sides of the packaged positive electrode stick out from the positive electrode supply table 120. Although it is not shown in FIG. 5 and FIG. 6, as shown in FIG. 7 and FIG. 8, transparent support boards 124 are provided on both sides of the positive electrode supply table 120. The support boards 124 support edge portions of the packaged positive electrode 20 which stick out from the positive electrode supply table 120. Moreover, clampers 126 are provided in positions which correspond to the support boards 124. The clampers 126 sandwich and fix the edge portions of the packaged positive electrode 20 with the support boards 124. Both the support boards 124 and the clampers 126 are movable and when the packaged positive electrode 20 is mounted on the positive electrode supply table 120, the support boards 124 and the clampers 126 approach the packaged positive electrode 20 so as to support and fix the edge portions of the packaged positive electrode 20.

Moreover, a light source 70 is provided below the positive electrode supply table 120 and a camera 80 is provided above the positive electrode supply table 120. The light source 70 is provided below the transparent support board 124 and irradiates a light to the edge portion of the packaged positive electrode 20. The light thus irradiated has a wave length that transmits the separator 40 with a predetermined permeability or more but does not transmit the positive electrode 24. The camera 80 receives the light which was irradiated by the light source 70 and transmitted the separator 40 while being interrupted by the positive electrode 24 and photographs an image of the position of the positive electrode 24. In other words, the camera 80 photographs an image of the positive electrode 24 based on the shadow of the positive electrode 24. On the basis of the position of the positive electrode 24 photographed by the camera 80, plan position the positive electrode 24 (packaged positive electrode 20) is adjusted. The suction hand 114 is enabled to pick up the packaged positive electrode 20 whose positive electrode 24 has been accurately positioned every time.

Back to FIG. 5 and FIG. 6, the negative electrode supply table 130 is a table for supplying the negative electrode 30 to the L-shaped arm 112. The negative electrode supply table 130 receives the negative electrode 30 produced in the previous process and carried by a suction conveyer 62 one by one and mounts it on the table. The negative electrode supply table 130 is also a suction conveyer and sucks the negative electrode 30 which is released from negative pressure from the suction conveyer 62, carries the negative electrode 30 to the approximate center of the table and sets the negative electrode 30 by negative pressure. When the negative electrode 30 is sucked by the suction hand 116, the negative electrode supply table 130 releases its suction of the electrode. Moreover, the negative electrode supply table 130 can move and rotate in planar direction in order to adjust plan position of the negative electrode 30. The negative electrode supply table 130 is provided on, for example, an XY stage 132 and the XY stage 132 moves in X and Y directions or rotates in planar direction to adjust plan position. The XY stage 132 is enabled to move and rotate in planar direction by three motors.

Moreover, a light source 72 and a camera 82 are provided above the negative electrode supply table 130. The light source 72 irradiates a light having a wavelength which is reflected or absorbed by the negative electrode 30. The camera 82 receives the light irradiated to and reflected by the negative electrode 30 or the light which was not absorbed by the negative electrode 30 but was reflected by the circumference of the electrode to photograph an image of the position of the negative electrode 30. The negative electrode supply table 130 adjusts plan position of the negative electrode 30 based on the position of the negative electrode 30 whose image was thus photographed by the camera 82. This adjustment enables the suction hand 116 to pick up the accurately positioned negative electrode every time.

The stacking stage 140 includes a mounting unit 142 for mounting a pallet where the packaged positive electrode 20 and the negative electrode 30 are alternately stacked, a driving unit 144 for moving the mounting unit 142 up and down, and four clampers 146 provided at the peripheral portions of the mounting unit 142.

The mounting unit 142 retains the stacked body 15 until predetermined number of the packaged positive electrodes 20 and the negative electrodes 30 are stacked to complete the power generation element 15 and upon completion, moves the power generation element 15 to the conveyer 64. The driving unit 144 adjusts the height of the mounting unit 142. Specifically, the driving unit 144 lowers the mounting unit 142 in response to the stacking process so that the height of the top surface of the stacked body 15 does not change even when the packaged positive electrode 20 and the negative electrode 30 are alternately stacked and the height of the stacked body 15 differs. Thus, the stacking robot 110 can stack the power generation element 15 by repeating the same operation irrespective of the progression of stacking. The clampers 146 fix four corners of the stacked body 15 every time the negative electrode 30 or the packaged positive electrode 20 is stacked so that the stacked body 15 is not displaced. In response to the progression of stacking, height of the mounting unit 142 is adjusted to be lowered and therefore the clampers 146 also can repeat clamping with the same stroke every time.

(Stacking Operation)

According to the sheet stacking device 100 configured as above, the packaged positive electrode 20 and the negative electrode 30, whose positions are adjusted, are mounted on the positive electrode supply table 120 and the negative electrode supply table 130 to be picked up by the stacking robot 110 and supplied to the stacking stage 140 in an alternate manner. Hereinafter, stacking operation of the sheet stacking device 100 will be explained with reference to FIG. 9 to FIG. 11.

FIGS. 9 to 11 are figures for explaining the stacking operation of the negative electrode and the packaged positive electrode by the stacking robot. Note that hereinafter, an operation for stacking the packaged positive electrode on the stacking stage 140 by the stacking robot 110 will be explained first.

As shown in FIG. 9(A), the packaged positive electrode 20 and the negative electrode 30 are mounted on the stacking stage 140 and the suction hand 114 is located above the stacking stage 140. On the top layer of the stacked body of the packaged positive electrode 20 and the negative electrode 30, the negative electrode 30 is provided and the suction hand 114 sucks and retains the packaged positive electrode 20. On the other hand, the suction hand 116 is placed above the negative electrode supply table 130. The negative electrode 30 is mounted on the negative electrode supply table 130.

Subsequently, the L-shaped arm 112 of the stacking robot 110 is lowered down for a predetermined amount (refer to FIG. 9(B)). Along with the lowering of the L-shaped arm 112, the suction hand 116 and the suction hand 114 are respectively lowered down on the negative electrode supply table 130 and the stacking stage 140. At this time, negative pressure is applied on the bottom surface of the suction hand 116 and the suction hand 116 sucks and retains the negative electrode 30. On the other hand, negative pressure of the suction hand 114 is released and the packaged positive electrode 20 is released.

Subsequently, the L-shaped arm 112 of the stacking robot 110 is moved up for a predetermined amount (refer to FIG. 10(C)). Along with the moving up of the L-shaped arm 112, the suction hand 116 picks up the negative electrode 30 from the negative electrode supply table 130. Moreover, the suction hand 116 and the suction hand 114 move to the upper side of the negative electrode supply table 130 and the stacking stage 140.

Subsequently, the L-shaped arm 112 of the stacking robot 110 is rotated for a predetermined amount (refer to FIG. 10(D)). When the L-shaped arm 112 is rotated by 90 degrees in horizontal direction, the suction hand 116 is placed above the stacking stage 140 and the suction hand 114 is placed above the positive electrode supply table 120.

Subsequently, the L-shaped arm 112 of the stacking robot 110 is moved down for a predetermined amount (refer to FIG. 11(E)). Along with the lowering down of the L-shaped arm 112, the suction hand 116 and the suction hand 114 reach the stacking stage 140 and the positive electrode supply table 120. At this time, negative pressure of the suction hand 116 is released and the suction hand 116 releases the negative electrode at the top surface of the stacked body on the stacking stage 140. On the other hand, negative pressure is applied on the bottom surface of the suction hand 114 and the suction hand 114 sucks and retains the packaged positive electrode 20 on the positive electrode supply table 120.

Subsequently, the L-shaped arm 112 of the stacking robot 110 is moved up for a predetermined amount (refer to FIG. 11(F)). Along with the moving up of the L-shaped arm 112, the suction hand 116 moves to the upper side of the stacking stage 140. On the other hand, the suction hand 114 picks up the packaged positive electrode 20 from the positive electrode supply table.

Subsequently, the L-shaped arm 112 of the stacking robot 110 is rotated for a predetermined amount. When the L-shaped arm 112 is rotated by −90 degrees in horizontal direction, the suction hand 116 is placed above the negative electrode supply table 130 and the suction hand 114 is placed above the stacking stage 140 (refer to FIG. 9(A)).

Repetition of the above operations allows the packaged positive electrode 20 and the negative electrode 30 to be stacked on the stacking stage 140. When the packaged positive electrode 20 and the negative electrode 30 are stacked for a predetermined number, the stacked body as the power generation element 15 is formed.

(Electrode Position Detection Device)

Next, an electrode position detection device 200 applied to the above-mentioned sheet stacking device 100 will be explained.

Back to FIG. 5 and FIG. 6, configuration of the electrode position detection device 200 will be explained.

The electrode position detection device 200 includes the light source 70, the camera 80, the XY stage 122, and the controller 160. The light source 70 and the camera 80 are respectively connected with the controller 160 and operation thereof is controlled by the controller 160. The electrode position detection device 200 includes the common configuration with the above-mentioned sheet stacking device 100.

The light source 70 is provided below the positive electrode supply table 120 as a first projector. The camera 80 is provided on the opposite side to the light source 70 with respect to the packaged positive electrode 20. The camera 80 photographs an image of the positive electrode 24 inside the packaged positive electrode 20. The light source 70 irradiates a light having a wavelength which transmits the separator 40 but does not transmit the positive electrode 24 (reflected or absorbed), which is, for example, a red light. The light from the light source 70 transmits the transparent support board 124 and is irradiated on an edge portion of the packaged positive electrode 20. Since the central part of the packaged positive electrode 20 is hidden by the positive electrode supply table 120, the light from the light source 70 is not irradiated there. Note that although it is known that the permeability becomes higher as the wavelength of the light becomes higher, the permeability varies depending on the material. The wavelength of the light to be irradiated need to be appropriately adjusted depending on the material of the separator 40. How to set the wavelength of the light to be irradiated will be described in details later.

The controller 160 detects the position of the positive electrode 24 as a detector on the basis of the image photographed by the camera 80. Hereinafter, operation of the electrode position detection device 200 when the position of the positive electrode 24 is detected (method for detecting the electrode position) will be explained.

Figure 12:
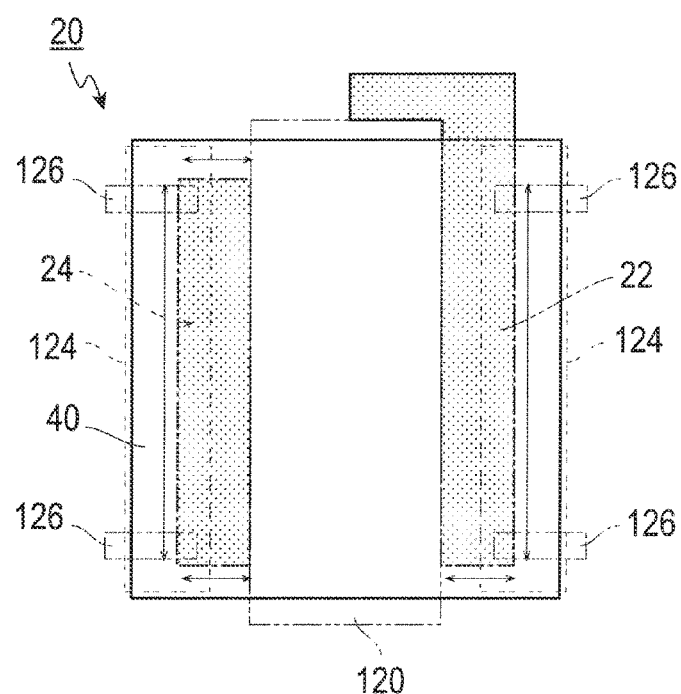
FIG. 12 is a conceptual diagram showing that the position of the positive electrode inside the packaged positive electrode is confirmed.
Figure 13:
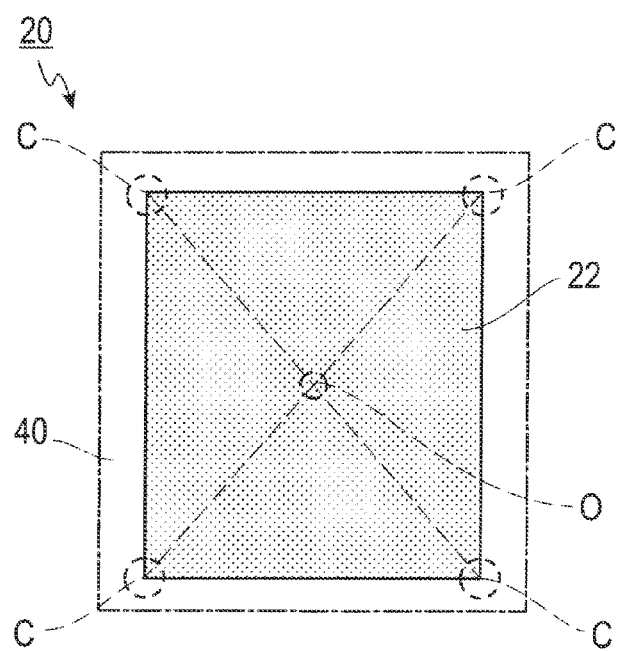
FIG. 13 is a conceptual diagram showing the position of the detected positive electrode.

FIG. 12 is a conceptual diagram showing how the position of the positive electrode inside the packaged positive electrode is confirmed, FIG. 13 is a conceptual diagram showing the position of the positive electrode thus detected, and FIG. 14 includes conceptual diagrams showing how position of the negative electrode is judged.

First, the packaged positive electrode 20 is mounted on the positive electrode supply table 120, edge portions of the packaged positive electrode 20 are supported by the transparent support boards 124, and the packaged positive electrode 20 is fixed by the clampers 126. After the packaged positive electrode 20 is fixed, the electrode position detection device 200 irradiates a light by use of the light source 70 before the packaged positive electrode 20 is sucked by the suction hand 114.

The irradiated light transmits the edge portion of the separator 40, but does not transmit the positive electrode 24. The camera 80 receives the light which transmitted the separator 40. That is, the camera 80 receives the light with a shadow of the positive electrode 24 via the positive electrode 24. By detecting the outline of the shadow, position of the positive electrode 24 can be detected. However, since a portion of the positive electrode 24 hidden by the positive electrode supply table 120 does not allow the light to transmit, position of the positive electrode 24 cannot be detected. For example, as shown in FIG. 12, shape and position of the edge portions of the positive electrode 24 is confirmed.

When an image like the one in FIG. 12 is obtained by the camera 80, the controller 160 analyzes the image and specifies sides of the positive electrode 24 within ranges indicated by double headed arrows in the figure. The controller 160 extends the specified sides to specify the position of the entire sides of the positive electrode 24. Although the positive electrode 24 has the tab portion 26, the controller 160 specifies the sides of coated portions where the positive electrode active material layer 22 is formed, as shown in FIG. 12. Therefore, the positive electrode 24 having sides whose positions were specified is specified as one having a rectangular shape, as shown in FIG. 13.

From the positive electrode 24 thus specified to be rectangular, as shown by dotted lines in FIG. 13, a rectangular square C is calculated based on the intersection of the sides. Moreover, averaging the position of the square C thus calculated, central point of the positive electrode 24 is calculated. In addition, on the basis of the posture of the sides thus specified, lean of the positive electrode 24 in planar direction is calculated. Position information and lean of the central point O of the positive electrode 24 thus calculated are stored in the storage unit 150.

The controller 160 reads out the position information and lean of the central point O of the positive electrode 24 from the storage unit 150 and controls the XY stage 122 so that the central point O is positioned in a predetermined position and the positive electrode 24 takes a uniform posture. The XY stage 122 moves/rotates the packaged positive electrode 20 in planar direction to adjust the position of the positive electrode 24. That is, the XY stage 122 functions as a position adjusting unit. Here, the position of the positive electrode 24 is adjusted to be in a standard position for the suction hand 114 to pick up the packaged positive electrode 20 for the purpose of accurate stacking of the positive electrode 24 and the negative electrode 30 on the stacking stage 140.

As described above, position of the positive electrode 24 itself provided in the separator 40 formed to have a bag-shape is detected in the present embodiment. Therefore, position of the packaged positive electrode 20 can be adjusted based not on the separator 40 but on the position of the positive electrode 24 thus detected. The positive electrode 24 is always delivered to the suction hand 114 at the predetermined position. As a result, the stacking robot 110 can accurately stack the positive electrode 24 without positional deviation. That is, position of the positive electrode 24 can be accurately determined indirectly with the negative electrode 30. The suction hand 114 and the XY stage 122 can appropriately stack the packaged positive electrode 20 and the negative electrode 30) as stacking unit based on the position of the positive electrode 24 thus detected.

Note that the electrode position detection device 200 detects not only the position of the positive electrode 24 but the position of the negative electrode 30. Here, the electrode position detection device 200 further includes the light source 72, the camera 82, and the XY stage 132.

Figure 19:
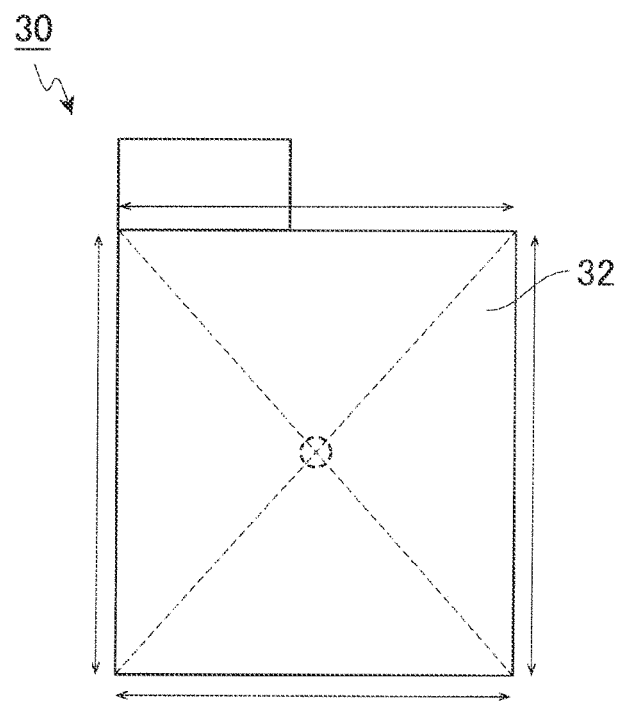
FIG. 19 is a conceptual diagram showing how the position of the negative electrode is judged.

The electrode position detection device 200 irradiates a light from the light source 72 to the negative electrode 30 mounted on the negative electrode supply table 130. The light to be irradiated may be a light of any wavelength as long as the light does not transmit (reflected by or absorbed by) the negative electrode 30. For example, a white light is irradiated. The irradiated light is reflected by the negative electrode 30. The camera 82 receives the reflected light via the negative electrode 30 and photographs an image of the negative electrode 30. FIG. 19 shows an image of the negative electrode 30 thus photographed. The controller 160 analyzes the result of image taking and detects each sides of the negative electrode 30. Moreover, the controller 160 calculates the position of a square c of the negative electrode 30 as an intersection of each sides thus detected. In addition, on the basis of the posture of the sides thus specified, lean of the positive electrode 24 in planar direction is calculated. Position information and lean of the central point o of the negative electrode 30 thus calculated are stored in the storage unit 150.

The controller 160 reads out the negative electrode 30 and lean of the central point o of the negative electrode 30 from the storage unit 150 and controls the XY stage 132 so that the central point o is positioned in a predetermined position and the negative electrode 30 takes a uniform posture. The XY stage 132 moves/rotates the negative electrode 30 in planar direction to adjust the position of the negative electrode 30. The XY stage 132 functions as a position adjusting unit. Thus, not only the above-mentioned positive electrode 24, but the negative electrode 30 can be delivered to the suction hand 116 at the same position every time. Here, the position of the positive electrode 24 is adjusted to be in a standard position for the suction hand 116 to pick up the negative electrode 30 for the purpose of accurate stacking of the positive electrode 24 and the negative electrode 30 on the stacking stage 140.

Note that accurate stacking of the positive electrode 24 and the negative electrode 30 means stacking judged to have no positional deviation and judgment thereof is carried out as follows.

Figure 18:
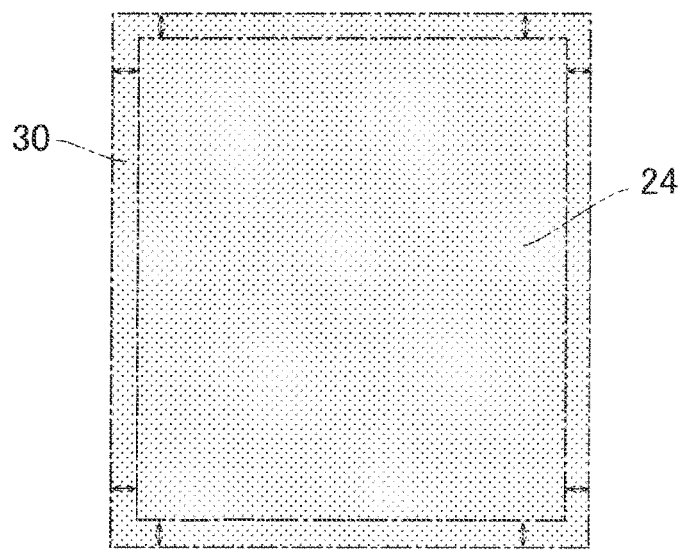
FIG. 18 is a conceptual diagram showing relative positions of a positive electrode 24 and the negative electrode.

FIG. 14 includes conceptual diagrams showing how position of the positive electrode 24 inside the packaged positive electrode is confirmed, FIG. 15 is a conceptual diagram showing the positive electrode whose sides are specified, FIG. 16 includes diagram showing how the position of the negative electrode is confirmed, FIG. 17 is a conceptual diagram showing the negative electrode 30 whose sides are specified, and FIG. 18 is a conceptual diagram showing relative positions of a positive electrode 24 and the negative electrode 30. Note that FIG. 14(A) is a conceptual diagram of a stacked body seen from front side when the position of the positive electrode 24 inside the packaged positive electrode is confirmed, and FIG. 14(B) is a conceptual diagram of the stacked body seen from plain surface. FIG. 16(A) is a conceptual diagram seen from front side of the stacked body when the position of the negative electrode 30 is confirmed, and FIG. 16(B) is a conceptual diagram seen from plain surface of the stacked body.

The packaged positive electrode 20 and the negative electrode 30 are alternately stacked on the stacking stage 140 by the above-mentioned sheet stacking device 100. The electrode position detection device 200 irradiates a light from the light source 70 to the packaged positive electrode 20 on the top layer of the stacked body 15.

As shown in FIG. 14(A), when the packaged positive electrode 20 is stacked on the top layer, the electrode position detection device 200 irradiates a light to the packaged positive electrode 20 from the light source 70. The light thus irradiated transmits the separator 40 of the positive electrode 20 and is reflected by the positive electrode 24. A camera (not shown) receives the reflected light via the positive electrode 24. The camera photographs an image of, for example, an area shown by dotted lines in FIG. 14(B). Moreover, one camera is provided. It is preferable that the camera has a wide field of view. As another configuration example, there may be four cameras for respectively photographing images of areas shown by dotted lines in FIG. 14(B). When images of the areas shown by dotted lines are obtained, the controller 160 analyzes the images and specifics part of sides of the positive electrode 24 within a range indicated by double headed arrows in the figure. The controller 160 extends the part of the sides of the positive electrode 24 thus specified and specifies position of sides of the positive electrode active material layer 22 which is a coated portion of the positive electrode 24. Thus, the position of the sides thus specified is expressed as a rectangular shape as shown in FIG. 15. Position information of the sides of the positive electrode active material layer 22 thus specified is stored in the storage unit 150 as information indicating the position of the positive electrode 24. Note that when the cameras photographs images without light from the light source, it becomes possible to specify the position of the separator 40 in a similar manner. Position information of the separator 40 thus specified may also be stored in the storage unit 150. Thus, relative position of the positive electrode 24 with the separator 40 as a standard can be specified. Note that part of the irradiated light transmits the separator 40 in the outer periphery of the positive electrode 24, further transmits the separator 40, and is reflected by the negative electrode 30. In this case, the camera receives the reflected light, but receives a light which is relatively weaker than receiving the reflected light from the positive electrode 24. Therefore, in the image thus photographed, the negative electrode 30 is photographed paler than the positive electrode 24. Therefore, the negative electrode 30 can be surely compared with the positive electrode 24 by the condition of the image.

Subsequently, when the negative electrode 30 is stacked on the stacked body 15 as shown in FIG. 16(A), the electrode position detection device 200 irradiates a light from the light source 72 to the negative electrode 30. The irradiated light is reflected by the negative electrode 30. The camera receives the reflected light via the negative electrode 32. The cameras photographs images of, for example, areas shown by dotted lines in FIG. 16(B). When images of the areas shown by dotted lines are obtained, the controller 160 analyzes the images and specifies part of sides of the negative electrode 30 within a range indicated by double headed arrows in the figure. The controller 160 extends the part of the sides of the negative electrode 30 thus specified and specifies position of sides of the negative electrode active material layer 32 which is a coated portion of the negative electrode 30. Thus, the position of the sides thus specified is expressed as a rectangular shape as shown in FIG. 17. Position information of the sides of the negative electrode active material layer 32 thus specified is stored in the storage unit 150 as information indicating the position of the negative electrode 30. Note that when the cameras photographs images of edges of the packaged positive electrode 20 stacked below the negative electrode 30 without light from the light source, it becomes possible to specify the position of the separator 40. Since the separator 40 is larger than the negative electrode 30, it is possible to photographs images of the edges of the separator 40 by the cameras even if the negative electrode 30 is stacked on the separator 40. Position information of the sides of the separator 40 thus specified by photographing may also be stored in the storage unit 150. Thus, relative position of the negative electrode 30 with the separator 40 as a standard can be specified.

The controller 160 sequentially detects the positions of the positive electrode 24 and the negative electrode 30 (relative position of the positive electrode 24 to the separator 40 and relative position of the negative electrode 30 to the separator 40) and store them in the storage unit 150 as described above. The controller 160 judges whether or not there is positional deviation in the negative electrode 30 or the positive electrode 24 after completion of the stacked body 15 as a battery element or during the stacking process of the stacked body 15.

When judging the positional deviation in the stacking, the controller 160 reads out position information of the sides of the positive electrode 24 and the negative electrode 30 from the storage unit 150 and detects relative position relation between the two. When detecting, the controller 160 overlays the specified positions of the positive electrode 24 and the negative electrode 30 as in FIG. 15 and FIG. 17. FIG. 18 shows a conceptual diagram of overlaid positions. The controller 160 analyzes the result of overlaying and judges relative positions of the positive electrode 24 and the negative electrode 30. Specifically, the controller 160 confirms the positions of the sides of the positive electrode 24 and the negative electrode 30 and confirms whether corresponding sides are positioned within a predetermined range. For example, in a case where the positive electrode 24 is smaller than the negative electrode 30 in a range overlapping the separator 40, the controller 160 confirms whether or not each of the sides of the positive electrode 24 is positioned on inner side of each of the sides of the negative electrode 30. Then, when all the sides of the positive electrode 24 are positioned on the inner side of the negative electrode 30, the controller 160 judges that there is no positional deviation in stacking. Judgment may be made not only depending on whether the sides are positioned inside or outside, but on the range of the length obtained by adding all the sides.

As described above, both the positive electrode 24 and the negative electrode 30 are taken at the same position every time by the suction hands 114 and 116. Therefore, the negative electrode 30 and the positive electrode 24 are stacked on the same position also on the stacking stage 140 every time and accurate stacking of the power generation element 15 can be achieved.

Moreover, in the above-mentioned embodiment, part of the sides of the positive electrode 24 is detected and entire sides are calculated from the detected side. Therefore, even though part of the positive electrode 24 is hidden by the positive electrode supply table 120 and entire length of the positive electrode 24 cannot be detected optically, outline of the positive electrode 24 can be specified.

Next, a wavelength of the light irradiated for the detection of the positive electrode will be explained.

Figure 20:
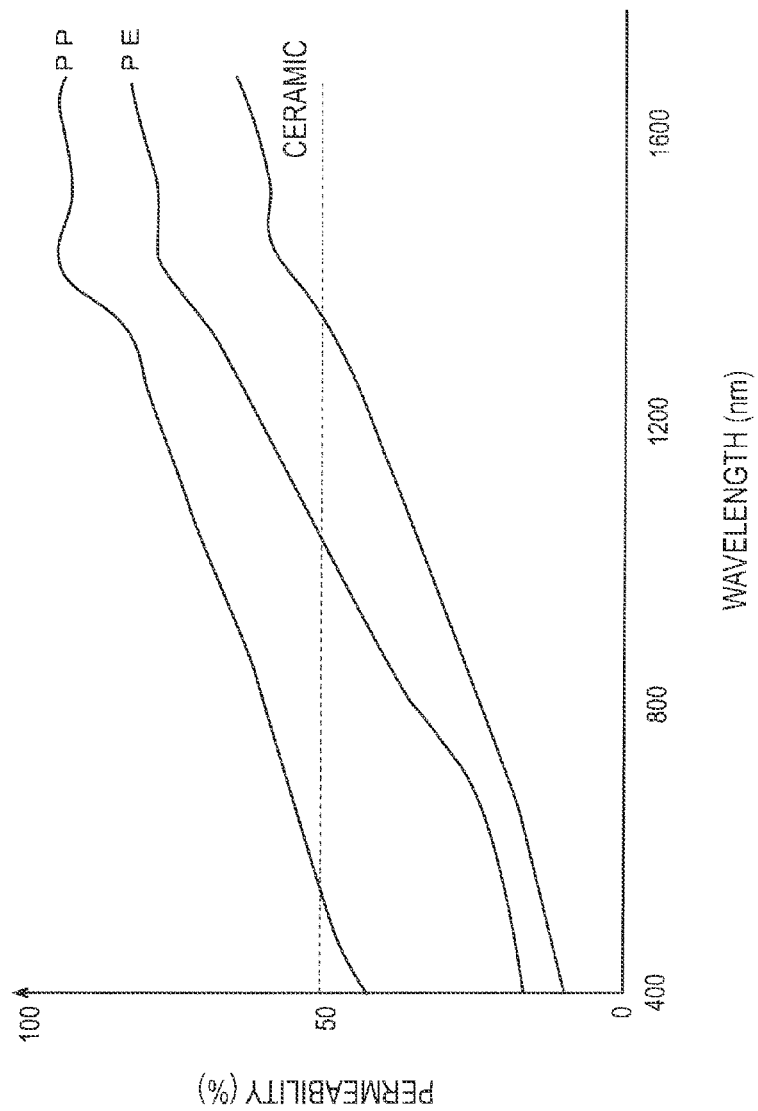
FIG. 20 is a schematic view showing permeability characteristics of the separator.

FIG. 20 is a schematic view showing permeability characteristics of the separator. In FIG. 20, abscissa axis represents a wavelength of a light (nm) and vertical axis represents permeability (%) of the light.

In FIG. 20, permeability characteristics of three types of separator, that is, a polypropylene separator, a polyethylene separator, and a ceramic separator, are shown. The polypropylene separator and the polyethylene separator are polymer backbones respectively formed with polypropylene and polyethylene. Moreover, the ceramic separator includes a base material of polypropylene on which porous membrane formed by joining a ceramic particle such as silica, alumina, zirconium oxide, or titanium oxide, and a binder is coated.

Referring to FIG. 20, permeability tendency of the separator 40 varies depending on the material. However, it is understood that permeability becomes high with a light having a longer wavelength. In the above-mentioned embodiment, it is necessary to irradiate a light from the light source 70 having a wavelength which transmits the separator 40 when detecting the positive electrode 24. Although it depends on the sensitivity of the camera 80, it is preferable that a light having a wavelength which enables permeability to be 50% or more is irradiated from the light source 70. When permeability is 50% or more, it becomes possible to cause the light to transmit the separator 40 and detect the positive electrode 24 without fail.

Note that since the positive electrode 24 is formed with a metal such as aluminum or copper, a light hardly transmits it. Therefore, as long as the wavelength of the light is high enough to transmit the separator 40, there is no upper limit for the wavelength.

As described above, irrespective of the material of the separator 40, wavelength of the light to be irradiated can be set on the basis of the permeability in terms of the separator 40. That is, the lower limit of the wavelength can be determined by the permeability in terms of the separator 40 (50% or more).

For example, in a case where a ceramic separator having the permeability characteristics of FIG. 20 is adopted, a light having a wavelength of approximately 1300 nm or more, for example, a near infrared light, may be used. Although it is more difficult for a light to transmit the ceramic separator compared to a polypropylene separator or a polyethylene separator, it becomes possible to cause the light to transmit by use of the near infrared light.

(Variation)

In the above-described embodiment, an embodiment in which the positive electrode 24 is packaged in the separator 40 as the packaged positive electrode 20 has been explained. However, the negative electrode 30 may be packaged in. In this case, position of the negative electrode as the packaged electrode in terms of the separator will be detected.

Moreover, in the above-described embodiment, the light source 70 is provided in a position opposite to the camera 80. However, position relation of the light source 70 and the camera 80 is not limited thereto. The light source 70 and the camera 80 may be provided on the same side in terms of the packaged positive electrode 20. In this case, the light irradiated from the light source 70 transmits the separator 40, is reflected by the positive electrode 24, and is photographed by the camera 80. That is, the camera 80 does not photograph the shadow of the positive electrode 24 but reflected light of the positive electrode 24.

Moreover, in the above-described embodiment, a case where the positive electrode lead 11 and the negative electrode lead 12 are derived from the same edge portion of the exterior material 13 was explained. However, the present invention is not limited thereto. The positive electrode lead 11 and the negative electrode lead 12 may be derived from opposite edge portions. In this case, when the power generation element 15 of the lithium-ion secondary battery 10 is formed, the packaged positive electrode 20 and the negative electrode 30 are stacked so that the tab portions 26 and 34 alternately face the opposite sides.

In addition, in the above-described embodiment, the standard position of the positive electrode 24 for the suction hand 114 to pick up the packaged electrode 20 is previously set and position of the packaged positive electrode 20 is adjusted so that the positive electrode 24 is positioned at the standard position. However, the present invention is not limited thereto. For example, position of the negative electrode 30 is detected by the electrode position detection device 200 and the position thereof is adjusted. Position of the negative electrode 30 can be stored in the storage unit 150. Based on the position of the negative electrode 30 thus stored, the standard position for picking up the positive electrode 24 may be computed and the position of the packaged positive electrode 20 may be adjusted so that the positive electrode 24 may be positioned at the standard position thus computed. Note that it is needless to say that in a case where the standard position and the position of the positive electrode 24 match, position of the positive electrode 24 does not need to be adjusted. Moreover, in a case where positional deviation of the standard position and the position of the positive electrode 24 is within the margin of error, position of the positive electrode 24 does not need to be adjusted.

(Another Electrode Position Detection Device)

Next, another electrode position detection device 200 applied to the sheet stacking device 100 will be explained.

Figure 21:
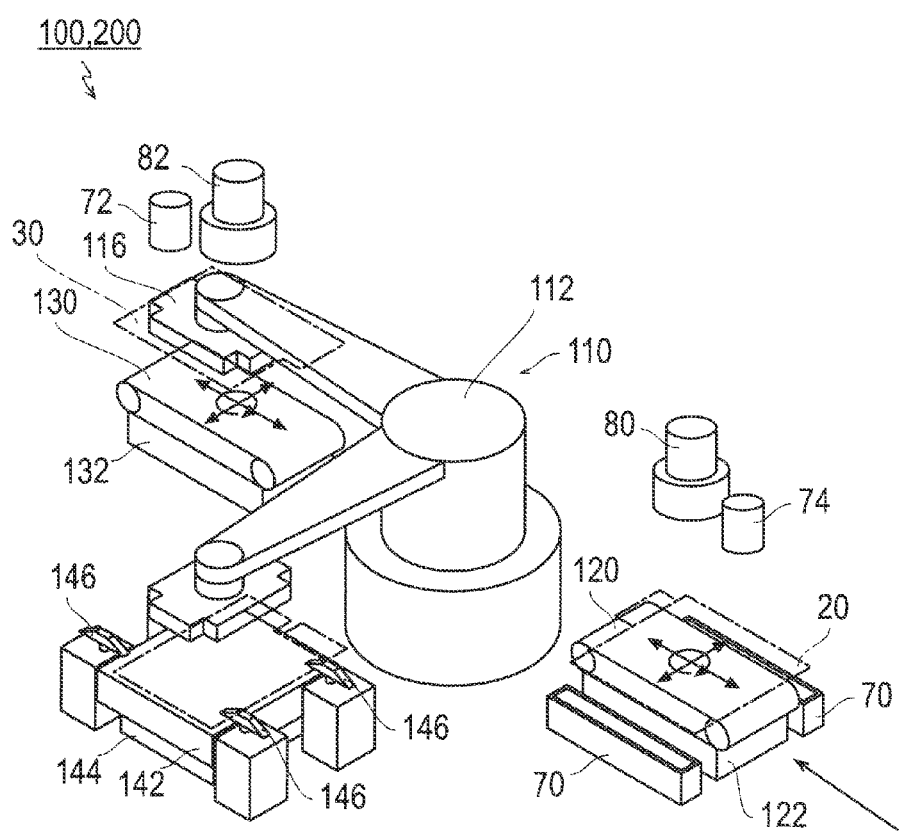
FIG. 21 is a perspective view showing another sheet stacking device.
Figure 22:
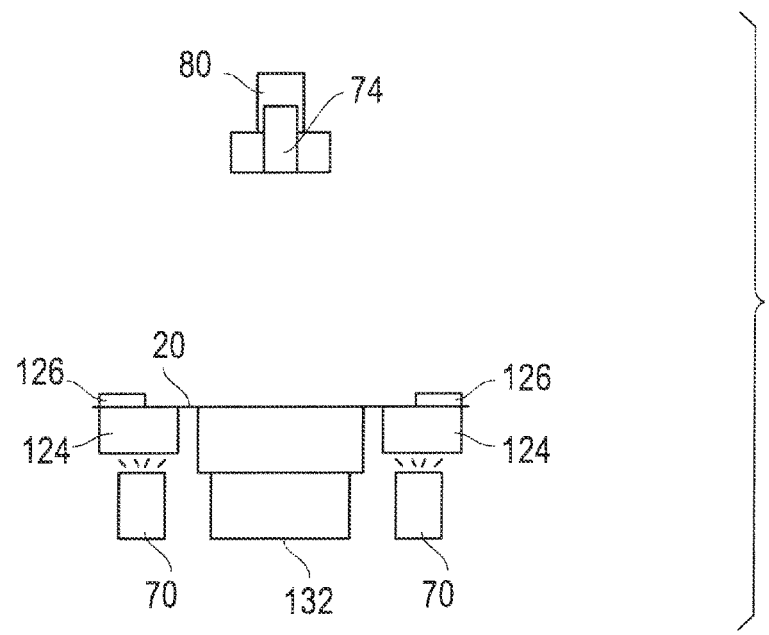
FIG. 22 is a front elevational view of a positive electrode supply table when seen in the direction of an arrow in FIG. 21.

Configuration of the electrode position detection device 200 will be explained with reference to FIG. 21. FIG. 22 is a front elevational view of a positive electrode supply table when seen in the direction of an arrow in FIG. 21.

The electrode position detection device 200 includes light sources 70 and 74, the camera 80, and the controller 160. The light sources 70 and 74 and the camera 80 are respectively connected with the controller 160 and operation of the light sources 70 and 74 and the camera 80 are controlled by the controller 160. The electrode position detection device 200 includes configuration common with the above-mentioned sheet stacking device 100.

The light sources 70 are provided below the positive electrode supply table 120 as a first projector. The camera 80 is provided at the position opposite to the light sources 70 in terms of the packaged positive electrode 20 as a first and second light receiver. The camera 80 photographs the positive electrode 24 inside the packaged positive electrode 20. The light sources 70 irradiate lights having a wavelength which transmits the separator 40 but does not transmit (reflected or absorbed by) the positive electrode 24, for example, a red light, (a first light) to the packaged positive electrode 20. The lights from the light sources 70 pass through the transparent support boards 124 and are irradiated onto the edge portions of the packaged positive electrode 20. Since the central part of the packaged positive electrode is hidden by the positive electrode supply table 120, the lights from the light sources 70 are not irradiated there.

The light source 74 is provided as a second projector on the same side as the camera 80 in terms of the packaged positive electrode 20. The light source 74 irradiates a light having a wavelength which is reflected by the separator 40, for example, a white light (a second light), to the packaged positive electrode 20. Note that although it is known that the permeability becomes higher as the wavelength of the light becomes longer, the permeability varies depending on the material. The wavelength of the light to be irradiated need to be appropriately adjusted depending on the material of the separator 40. How to set the wavelength of the light to be irradiated will be described in details later.

The controller 160 detects the position of the positive electrode 24 and the separator 40 as a detector based on photographing by the camera 80. Hereinafter, operation of the electrode position detection device 200 (electrode position detection method) when detecting the position of the positive electrode 24 will be explained.

Figure 24:
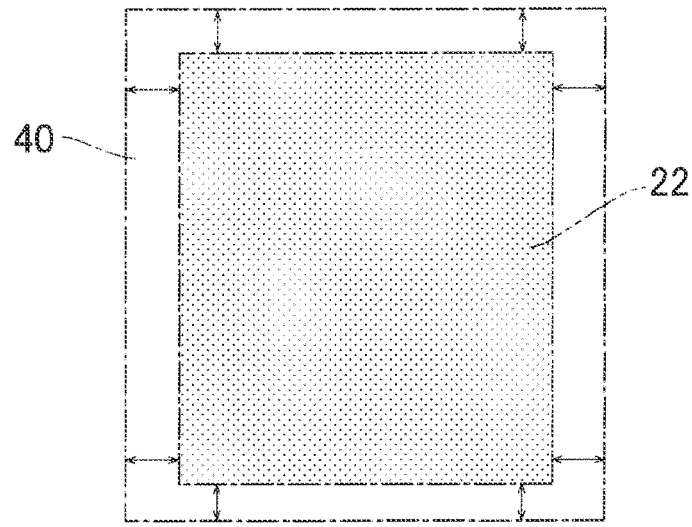
FIG. 24 is a conceptual diagram showing how the position of the positive electrode is confirmed.

FIG. 23(A) is a conceptual diagram showing how the position of the positive electrode inside the packaged positive electrode is confirmed, FIG. 23(B) is a conceptual diagram showing how the position of the separator is confirmed, and FIG. 24 is a conceptual diagram showing how the position of the positive electrode is judged.

First, the packaged positive electrode 20 is mounted on the positive electrode supply table 120 and the edge portions of the packaged positive electrode 20 are supported by transparent support boards 124 and fixed by the clampers 126. After the fixing, the electrode position detection device 200 irradiates lights by the light sources 70 and 74 before the packaged positive electrode 20 is sucked by the suction hand 114. Irradiation of the lights is not carried out simultaneously, but is carried out sequentially. For example, irradiation of the light is carried out by the light source 70 first.

The light thus irradiated transmits the edge portions of the separator 40 but does not transmit the positive electrode 24. The camera 80 receives the light which transmitted the separator 40. That is, the camera 80 receives the light with a shadow of the positive electrode 24 via the positive electrode 24. It becomes possible to detect the position of the positive electrode 24 by detecting the outline of the shadow. However, since the light does not transmit a portion of the positive electrode 24 hidden by the table 120, position of the positive electrode 24 cannot be detected. For example, as shown by colored parts in FIG. 23(A), shape and position of the edge positions of the positive electrode 24 are confirmed.

When an image as the one in FIG. 23(A) is obtained by the camera 80, the controller 160 analyzes the image and specifies sides of the positive electrode 24 in a range indicated by double headed arrows in the figure. Extending the sides thus specified, the controller 160 specifies positions of the entire sides of the positive electrode 24. Although the positive electrode 24 has the tab portion 26, the controller 160 specifies the sides of coated portions where the positive electrode active material layer 22 is formed, as shown in FIG. 23(A). Therefore, the positive electrode 24 having sides whose positions were specified is specified as one having a rectangular shape, as shown in FIG. 23(B). Position information of the sides of the positive electrode 24 thus specified is stored in the storage unit 150.

Subsequently, irradiation of a light by the light source 74 to the packaged positive electrode 20 is carried out. The irradiated light is reflected by the separator 40 and received by the camera 80. The camera 80 receives an entire image of the separator 40. For example, as shown in FIG. 23(B), position of the separator 40 is confirmed. When an image as the one in FIG. 23(B) is obtained by the camera 80, the controller 160 analyzes the image and specifies sides of the separator 40 in a range indicated by double headed arrows in the figure. Position information of the sides of the separator 40 thus specified is stored in the storage unit 150.

The controller 160 reads out the position information of the sides of the separator 40 and the positive electrode 24 from the storage unit 150 and confirms the position of the positive electrode 24 in terms of the separator 40. For example, the controller 160 overlaps positions of the sides of the separator 40 and the positive electrode 24 and measures distance of the positions indicated by double headed arrows. The positive electrode 24 being overlapped here does not show the tab portion 26 and shows only the portion included in the separator 40. Then, the controller 160 judges whether the measured distance is within a predetermined range or not to judge whether the position of the positive electrode 24 is normal or abnormal. The predetermined range is previously set as a range of distance from each side of the separator 40 and is appropriately determined according to the standards of the packaged positive electrode 20 or the like. In a case where the controller 160 finds out that at least one side of the positive electrode 24 is not within the predetermined range in terms of the position of the side of the separator 40, the controller 160 can eliminate the packaged positive electrode 20 from the stacking robot 110 or store in the storage 150 in which power generation element 15 the positive electrode was incorporated and later eliminate the power generation element 15 as a defective product.

As described above, in the present embodiment, position of the positive electrode 24 itself provided in the bag-shaped separator 40 is detected so that relative position of the positive electrode 24 to the separator 40 can be detected. Therefore, it becomes possible to check whether the relative position is within an acceptable range or not, that is, whether the positive electrode 24 is accurately positioned in the separator 40 without fail. As a result, it becomes possible to prevent formation of the power generation element 15 in which the positive electrode 24 deviated from correct position is packaged in the separator 40 and shipment of such an element. Since the position of the separator 40 is also detected, it becomes possible to judge whether or not the position of the positive electrode 24 is good based on the relative position relation with the separator 40.

Moreover, the camera 80 can commonly receive lights from both the light source 70 and the light source 74. Therefore, it is not necessary to prepare cameras respectively for the light sources 70 and 74 and facility cost can be reduced.

In addition, in the above-described embodiment, part of the side of the positive electrode 24 is detected and the entire sides are calculated from the detected side. Therefore, even though part of the positive electrode 24 is hidden by the positive electrode supply table 120 and entire length of the sides of the positive electrode 24 cannot be optically detected, it becomes possible to specify the outline of the positive electrode 24.

Note that the light irradiated from the light source 74 is for detection of the separator 40 being exposed. Therefore, the light source 74 irradiates a light which does not transmit the separator 40 much, for example, a light having a wavelength which allows permeability to be 50% or less.

(Variation)

In the above-described embodiment, the electrode position detection device 200 detected the position of the positive electrode 24 in terms of the packaged positive electrode 20 mounted on the positive electrode supply table 120. However, the present invention is not limited thereto. In the process of producing the lithium-ion secondary battery 10, electrode detection by the electrode position detection device 200 can be applied in any process following the formation of the packaged positive electrode 20. For example, position of the positive electrode 24 in terms of the separator 40 may be detected right after the positive electrode 24 was sandwiched by two separators 40 and packaged in.

Moreover, in the above-described embodiment, whether the relative position of the positive electrode 24 is good or bad is judged depending on whether the position of the sides of the positive electrode 24 is within the predetermined range or not with reference to the position of the sides of the separator 40. However, the standards for evaluation of the relative position of the positive electrode 24 are not limited thereto. For example, corners (four corners) of the separator 40 and the positive electrode 24 may be respectively calculated, the central position of the separator 40 and the positive electrode 24 may be respectively calculated from an average position of the corners, and the position of the positive electrode 24 may be evaluated on the basis of the deviation of the central positions.

In addition, in the above-described embodiment, one camera 80 received lights from both the light sources 70 and 74. However, cameras for receiving lights may be provided for the light sources 70 and 74 respectively. In this case, for example, design can be changed by providing the light sources 70 and 74 on the same side, or the like.

Furthermore, in the above-described embodiment, a case where the positive electrode lead 11 and the negative electrode lead 12 are derived from the same edge portion of the exterior material 13 was explained. However, the present invention is not limited thereto. The positive electrode lead 11 and the negative electrode lead 12 may be derived from opposite edge portions. In this case, when the power generation element 15 of the lithium-ion secondary battery 10 is formed, the negative electrode 30 and the packaged positive electrode 20 are stacked so that the tab portions 26 and 34 alternately face the opposite sides.

(Detection of Turn of Separator)

In the above-described embodiment, relative position of the positive electrode 24 to the separator 40 is detected. However, the camera 80 also photographs the separator 40 itself. Therefore, it may be judged whether the separator 40 is normal or not based on the photographing result of the separator 40 itself.

Figure 25:
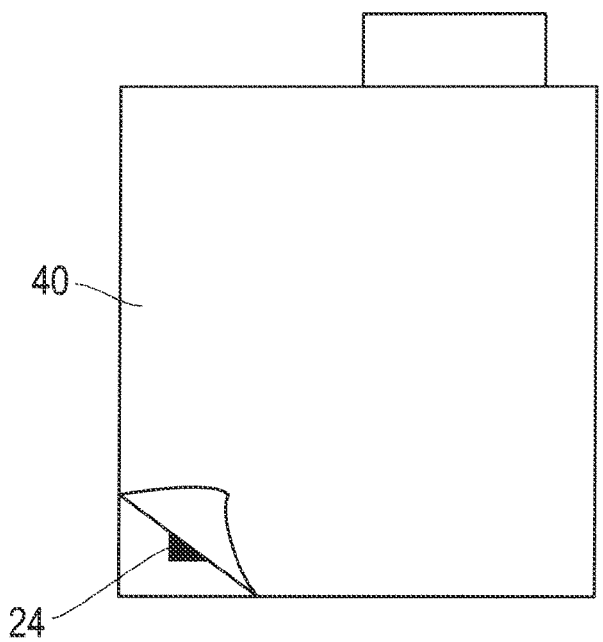
FIG. 25 is a schematic view showing an example of a case where the separator is turned.

FIG. 25 is a schematic view showing an example of a case where the separator is turned. The controller 160 can detect that the separator 40 is abnormal in a case where the left lower corner of the separator 40 in the figure is turned, as shown in FIG. 25.

Turn of the separator 40 can be detected as follows. The controller 160 irradiates a light from the light source 74 and a light reflected by the separator 40 is received by the camera 80. The controller 160 analyzes an image photographed by the camera 80 and distinguishes the whitish separator 40 from the blackish positive electrode 24. For example, the controller 160 detects the positive electrode 24 by the difference in brightness. In a case where the black positive electrode 24 is detected in a range where the separator 40 is to be located, turn of the separator 40 and exposure of the positive electrode 24 can be detected.

Detection of the separator 40 can be simultaneously carried out when the above-mentioned judgment of relative position of the positive electrode 24 to the separator 40 is carried out.

According to the above-described configuration, it becomes possible to detect turn of the separator 40 and to detect defect of the packaged positive electrode 20 more accurately.

(Detection of Joining Portion)

In the above-described embodiment, position of the positive electrode relative to the separator 40 is detected. Additionally, position of a joining portion 42 of the separator 40 may be evaluated.

When the separator 40 is formed into the bag-shape, an edge side is connected by, for example, thermal welding. At this time, the joining portion 42 are formed as shown in FIG. 3(B). The joining portion 42 for connecting the separators 40 have different physical property from the original separator 40 and permeability of light also differs from portions other than the joining portion 42. Permeability of the joining portion 42 is lower than other parts of the separator 40. Therefore, by controlling the wavelength of the light irradiated from the light source 70, it becomes possible to also detect the positions of the joining portion 42 when the position of the positive electrode 24 is detected.

Positions of the joining portion 42 thus detected can be evaluated through comparison with the position of the separator 40 detected in the above-described embodiment. That is, similarly to the case of the positive electrode 24, with reference to positions of each side of the separator 40, distance of the corresponding joining portion 42 is calculated. When the distance thus calculated is within a predetermined range, it is judged that the position of the joining portion 42 is normal and when the distance is out of the predetermined range, it is judged that the joining portion 42 is abnormal.

INDUSTRIAL APPLICABILITY

There is a possibility that the present invention can be used for manufacturing of a battery.

REFERENCE SIGNS LIST

10 Lithium-ion secondary battery
11 Positive electrode lead
12 Negative electrode lead
15 Power generation element, stacked body
20 Packaged positive electrode
24 Positive electrode
30 Negative electrode
32 Negative electrode active material layer
34 Tab portion
40 Separator
60, 62 Suction conveyers
70, 72, 74 Light sources
80, 82 Cameras
100 Sheet stacking device
110 Stacking robot
112 L-shaped arm
114, 116 Suction hands
120 Positive electrode supply table
122 XY stage
124 Support board
126 Clamper
130 Negative electrode supply table
132 XY stage
140 Stacking stage
142 Mounting unit
144 Driver
160 Controller
200 Electrode position detection device

The invention claimed is:

1. An electrode stacking device configured to stack a packaged electrode, made by providing a first electrode between a first separator and a second separator such that the first separator and the second separator together form a bag-shaped separator, on a second electrode having a different polar characteristic from that of the first electrode on a stacking stage, comprising:
   a detector configured to detect position of the first electrode within the packaged electrode mounted on a supply table of the packaged electrode;
   a position adjustment unit configured to adjust a position of the packaged electrode to be picked up from the supply table on the basis of the position of the first electrode detected by the detector so that the first electrode within the packaged electrode is positioned in a predetermined position; and
   a stacking unit configured to pick up the packaged electrode whose position is adjusted by the position adjustment unit from the supply table, and then stack the packaged electrode on the second electrode being mounted on the stacking stage.

2. The electrode stacking device according to claim 1, wherein the position adjustment unit adjusts the position of the packaged electrode on the supply table on the basis of the position of the first electrode detected by the detector and a standard position required for stacking the first electrode on the second electrode.

3. The electrode stacking device according to claim 2, wherein the position adjustment unit is a stage which can at least either move or rotate in a planar direction to move or rotate the packaged electrode mounted on the stage in the planar direction, the stage being included in the supply table.

4. The electrode stacking device according to claim 1, wherein the detector detects sides of the first electrode and detects the position of the first electrode on the basis of the position of the sides.

5. The electrode stacking device according to claim 1, wherein each of the packaged electrode and the second electrode are independent from each other and have a flat shape.

6. The electrode stacking device according to claim 1, wherein the packaged electrodes and the second electrodes are stacked in an alternating manner.

7. The electrode stacking device according to claim 1, wherein the detector:
includes a first projector that irradiates a first light which transmits through the bag-shaped separator but does not transmit the first electrode to the first electrode, and
a first light receiver configured to receive the first light which transmitted through the bag-shaped separator, and
detects the position of the first electrode on the basis of the light receiving result by the first light receiver.

8. The electrode stacking device according to claim 7, wherein the first light irradiated by the first projector is a light having a wavelength which enables permeability of the light through the bag-shaped separator to be 50% or more.

9. The electrode stacking device according to claim 8, wherein the bag-shaped separator is a ceramic separator and the first light is a near infrared light.

10. The electrode stacking device according to claim 7, wherein the bag-shaped separator is a ceramic separator and the first light is a near infrared light.

11. The electrode stacking device according to claim 7, wherein the detector includes:
a second projector configured to irradiate a second light which is reflected by the bag-shaped separator,
a second light receiver configured to receive the second light reflected by the bag-shaped separator, and
a detector configured to detect the positions of the bag-shaped separator and the first electrode on the basis of the light receiving result by the first light receiver and the second light receiver and to detect a relative position of the first electrode to the bag-shaped separator.

12. The electrode stacking device according to claim 11, wherein the detector judges whether the relative position of the first electrode to the bag-shaped separator is good or not.

13. The electrode stacking device according to claim 11, wherein the first projector and the second projector are provided to oppose each other via the first electrode,
the first light receiver and the second light receiver are realized by a common light receiver, and
position of the first electrode is detected on the basis of the shadow of the first light blocked by the first electrode.

14. The electrode stacking device according to claim 11, wherein the detector detects sides of the bag-shaped separator and the first electrode and detects the position of the first electrode in terms of the bag-shaped separator on the basis of the positions of each of the sides.

15. The electrode stacking device according to claim 11, wherein the detector checks whether the bag-shaped separator is turned on the basis of the light receiving result by the second light receiver.

16. The electrode stacking device according to claim 11, wherein:
the bag-shaped separator is formed by joining edge portions of the first and second separators by a joining portion, and
the detector detects the joining portion on the basis of the light receiving result by the first light receiver and judges whether position of the first electrode is good or not on the basis of the relative position of the first electrode to the joining portion.

17. The electrode stacking device according to claim 11, wherein the first light irradiated by the first projector is a light having a wavelength that enables permeability through the bag-shaped separator to be 50% or more.

* * * * *